United States Patent
Poehlmann-Martins et al.

(10) Patent No.: US 12,512,744 B2
(45) Date of Patent: Dec. 30, 2025

(54) VOLTAGE REGULATOR CIRCUITS, RADIATION DEVICES AND RADIATION SYSTEMS INCLUDING THE SAME

(71) Applicant: Varian Medical Systems, Inc., Palo Alto, CA (US)

(72) Inventors: Flavio Poehlmann-Martins, Fremont, CA (US); Ogy Sabev, San Jose, CA (US); Bill Main, Palo Alto, CA (US); Alexander Cahill, Palo Alto, CA (US); Reza Alibazi Behbahani, North Brunswick, NJ (US); Raj Pai, Palo Alto, CA (US)

(73) Assignee: VARIAN MEDICAL SYSTEMS, INC., Palo Alto, CA (US)

( * ) Notice: Subject to any disclaimer, the term of this patent is extended or adjusted under 35 U.S.C. 154(b) by 269 days.

(21) Appl. No.: 18/069,363

(22) Filed: Dec. 21, 2022

(65) Prior Publication Data

US 2024/0213872 A1    Jun. 27, 2024

(51) Int. Cl.
*H02M 3/07* (2006.01)
*H02M 1/00* (2006.01)

(52) U.S. Cl.
CPC .......... *H02M 1/0032* (2021.05); *H02M 3/07* (2013.01); *H02M 1/0006* (2021.05)

(58) Field of Classification Search
None
See application file for complete search history.

(56) References Cited

U.S. PATENT DOCUMENTS

| | | | | |
|---|---|---|---|---|
| 4,353,113 A * | 10/1982 | Billings | .................... | H03F 9/00 363/21.09 |
| 4,449,173 A * | 5/1984 | Nishino | ............ | H02M 3/33561 323/272 |
| 4,517,633 A * | 5/1985 | Melcher | ............ | H02M 3/33561 363/21.04 |
| 4,669,036 A * | 5/1987 | Cowett, Jr. | ....... | H02M 3/33561 323/267 |
| 10,546,711 B2 | 1/2020 | Trail et al. | | |
| 2002/0159276 A1* | 10/2002 | Deboy | .............. | H02M 3/33507 363/20 |
| 2018/0061609 A1 | 3/2018 | Trail et al. | | |
| 2023/0063755 A1 | 3/2023 | Poehlmann-Martins et al. | | |
| 2023/0065037 A1 | 3/2023 | Poehlmann-Martins et al. | | |
| 2023/0066389 A1 | 3/2023 | Poehlmann-Martins et al. | | |

FOREIGN PATENT DOCUMENTS

| | | |
|---|---|---|
| JP | S4977399 U | 7/1974 |
| JP | H01209076 A | 8/1989 |

* cited by examiner

*Primary Examiner* — Kenneth B Wells

(74) *Attorney, Agent, or Firm* — Harness, Dickey & Pierce, P.L.C.

(57) ABSTRACT

A radiation system includes a modulator and at least one voltage regulator. The modulator is configured to output a voltage for operation of a magnetron and an electron gun of the radiation system. The at least one voltage regulator circuit is electrically connected between the modulator and at least one of the magnetron or the electron gun, and configured to control a magnitude of the voltage output from the modulator for operation of the magnetron and the electron gun.

20 Claims, 18 Drawing Sheets

# VOLTAGE REGULATOR CIRCUITS, RADIATION DEVICES AND RADIATION SYSTEMS INCLUDING THE SAME

TECHNICAL FIELD

One or more example embodiments relate to voltage regulator circuitry, radiation devices and/or radiation systems including the same.

BACKGROUND

Radiation therapy involves medical procedures that selectively deliver high doses of radiation to certain areas inside a human body. A radiation machine, device or system for providing radiation therapy includes an electron source that provides electrons, and an accelerator that accelerates the electrons to form an electron beam. The electron beam is delivered downstream to strike a target to generate radiation. The radiation is then collimated to provide a radiation beam having desired characteristics for treatment purposes.

Radiation may also be used to provide imaging of a patient so that internal tissue may be visualized.

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

Independent of the grammatical term usage, individuals with male, female or other gender identities are included within the term.

Radiation therapy systems may utilize a modulator (e.g., a solid-state modulator) to deliver high voltage pulses to both the magnetron and electron gun. By using a single device to power the electron gun and magnetron, the need for a separate electron gun driver may be eliminated. However, use of a single unit to provide power to the electron gun and magnetron also results in intrinsic linking between the voltages that are supplied to these two components as they are both powered from the same pulse transformer. Accordingly, if the magnetron voltage needs to be varied to tune beam energy, the electron gun voltage changes accordingly, which leads to changes in beam current. In other words, beam energy and beam current cannot be controlled independently. As a result, the tunability of the machine may be constrained significantly. This lack of adjustability may impose tight tolerances on various system components, particularly electron guns.

The high transformer ratio often used in solid state modulators may also lead to the potential for violent voltage spikes to be induced when the magnetron enters the wrong mode. These voltage spikes may increase the rate of arcing in the magnetron, which in turn may lead to reduced magnetron lifetime.

When magnetron arcing occurs, relatively strong coupling into the electron gun may be observed. Voltage spikes on the electron gun may lead to catastrophic arcing that destroys the electron gun.

One or more example embodiments provide a relatively compact voltage regulator circuit that may be arranged in line between the modulator and the electron gun and/or between the modulator and the magnetron. At least when arranged between the modulator and the electron gun, the voltage regulator circuit may enable tunability of the electron gun voltage and/or protect the electron gun from voltage spikes when magnetron arcing occurs.

One or more example embodiments may also provide a voltage clamping function for the electron gun that extends to the magnetron as a result of the magnetic coupling through the transformer coil. Accordingly, a single voltage regulator device arranged between, for example, the modulator and the electron gun may protect both the electron gun and the magnetron.

As discussed herein, voltage regulator circuits according to one or more example embodiments may encompass and/or function as voltage limiter devices, voltage clamp devices and/or voltage control devices.

At least one example embodiment provides a radiation system comprising: a modulator configured to output a voltage for operation of a magnetron and an electron gun of the radiation system; and at least one voltage regulator circuit electrically connected between the modulator and at least one of the magnetron or the electron gun, the at least one voltage regulator circuit configured to control a magnitude of the voltage output from the modulator for operation of the magnetron and the electron gun.

At least one example embodiment provides a radiation system comprising: a means for outputting a voltage for operation of a magnetron and an electron gun of the radiation system; and a means for controlling a magnitude of the voltage output from the modulator for operation of the magnetron and the electron gun, the means for controlling being electrically connected between the modulator and at least one of the magnetron or the electron gun.

According to at least some example embodiments, the at least one voltage regulator circuit may be configured to downregulate or limit the magnitude of the voltage output from the modulator for operation of the magnetron and the electron gun.

The at least one voltage regulator circuit may be electrically connected between the modulator and one of the magnetron or the electron gun.

The at least one voltage regulator circuit may be electrically connected between the modulator and the electron gun.

The at least one voltage regulator circuit may be configured to control the magnitude of the voltage output from the modulator by diverting current in excess of a threshold from the modulator to a charge storage circuit.

The charge storage circuit may include a storage capacitor.

The at least one voltage regulator circuit may be configured to regulate a voltage output from the modulator for operation of the electron gun.

The at least one voltage regulator circuit may include: a voltage tuning circuit electrically connected between the modulator and the electron gun; and a regulated power supply electrically connected to the voltage tuning circuit, the regulated power supply configured to apply a bias voltage to a first node of the voltage tuning circuit to tune the voltage output from the modulator for operation of the electron gun.

The voltage tuning circuit may include a charge storage circuit connected to the first node. The voltage tuning circuit may be configured to tune the voltage output from the modulator by diverting current in excess of a threshold current value, from the modulator to the charge storage circuit.

The radiation system may further include a discharge circuit electrically connected to the first node. The discharge circuit may be configured to discharge the charge storage` circuit in response to determining that the bias voltage exceeds a threshold voltage value.

The at least one voltage regulator circuit may include: an electron gun regulator circuit electrically connected between the modulator and the electron gun; and a magnetron regulator circuit electrically connected between the modulator and the magnetron.

The at least one voltage regulator circuit may be configured to tune the voltage output from the modulator for operation of the electron gun independent of the voltage output from the modulator for operation of the magnetron.

The modulator may be a solid-state modulator.

The at least one voltage regulator circuit may be electrically connected between the modulator and the magnetron.

The at least one voltage regulator circuit may include a voltage tuning circuit electrically connected between the modulator and the electron gun. The voltage tuning circuit may have a first node and be configured to provide a bias voltage at the first node to tune the voltage output from the modulator for operation of the magnetron and the electron gun.

The voltage tuning circuit may include a charge storage circuit configured to provide the bias voltage at the first node. The charge storage circuit may be further configured to be charged by pulses output from the modulator.

The radiation system may include a discharge circuit electrically connected to the first node. The discharge circuit may be configured to discharge the charge storage circuit in response to determining that the bias voltage exceeds a threshold voltage value. The at least one voltage regulator circuit may include a voltage tuning circuit electrically connected between the modulator and the magnetron. The voltage tuning circuit may be configured to provide a bias voltage to tune the voltage output from the modulator for operation of the magnetron and the electron gun.

At least one other example embodiment provides a radiation system comprising: a modulator configured to output a voltage for operation of a magnetron and an electron gun of the radiation system, the modulator including a transformer winding; and a voltage regulator circuit electrically connected to a stand-alone tab from the transformer winding of the modulator, the voltage regulator circuit configured to control a magnitude of the voltage output from the modulator for operation of the magnetron and the electron gun.

At least one other example embodiment provides a radiation system comprising: a means for outputting a voltage for operation of a magnetron and an electron gun of the radiation system, the means for outputting including a transformer winding; and a means for controlling a magnitude of the voltage output from the modulator for operation of the magnetron and the electron gun, the means for controlling being electrically connected to a stand-alone tab from the transformer winding of the modulator.

The stand-alone tab may be separate from a first tab connected to the electron gun and a second tab connected to the magnetron.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

As discussed herein the terminology "one or more" and "at least one" may be used interchangeably.

It will be appreciated that a number of example embodiments may be used in combination.

Although one or more example embodiments may be discussed herein with regard to an embodiment of a voltage regulator circuit positioned between a modulator and an electron gun or between a modulator and a magnetron, it should be understood that example embodiments should not be limited to such examples. Rather, a voltage regulator circuit described as positioned between the modulator and the electron gun may also be positioned between the modulator and the magnetron, or vice versa.

Figure 1A:
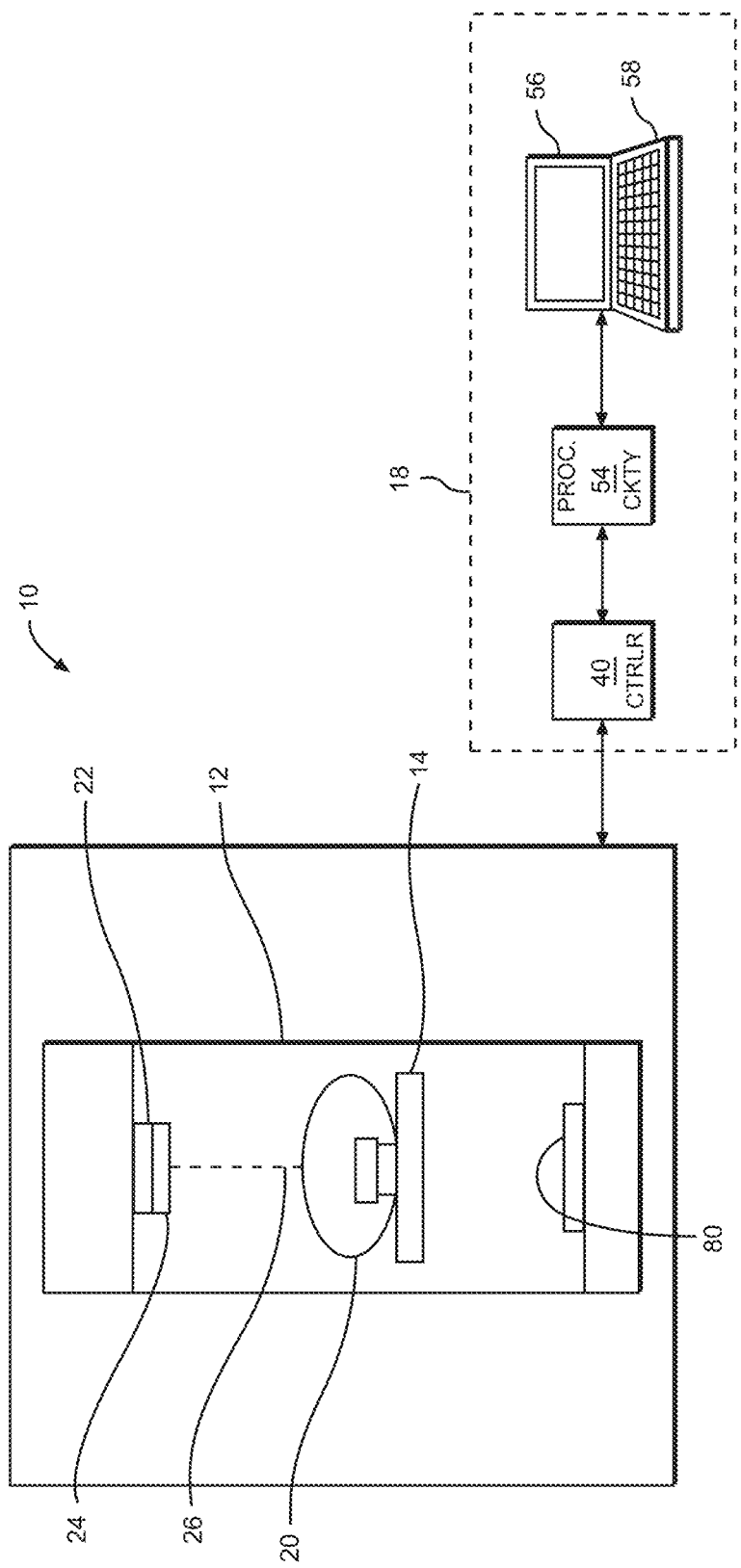
FIG. 1A illustrates a radiation treatment system in accordance with example embodiments.

FIG. 1A illustrates a radiation treatment system according to example embodiments.

Referring to FIG. 1A, the radiation treatment system 10 includes an arm gantry 12, a patient support 14 for supporting a patient 20, and a control system 18 to control operation of the gantry 12 and delivery of radiation. The radiation treatment system 10 also includes a radiation source 22 that projects a beam 26 of radiation towards the patient 20 while the patient 20 is supported on the patient support 14, and a collimator 24 for changing a cross sectional shape of the beam 26. The radiation source 22 may be configured to generate a cone beam, a fan beam, or other types of radiation beams. Also, in other example embodiments, the radiation source 22 may be configured to generate a proton beam, electron beam, or neutron beam, as a form of radiation for treatment purposes. The radiation treatment system 10 may also have another form and/or configuration in other example embodiments. For example, instead of an arm gantry, the radiation treatment system 10 may have a ring gantry.

In the example embodiment shown in FIG. 1A, the radiation source 22 is a treatment radiation source for providing treatment energy. In other example embodiments, in addition or alternative to being a treatment radiation source, the radiation source 22 may be a diagnostic radiation source for providing diagnostic energy for imaging purposes. In such cases, the radiation treatment system 10 may include an imager, such as the imager 80, located at an operative position relative to the radiation source 22 (e.g., under the patient support 14). In further example embodiments, the radiation source 22 may be a treatment radiation source for providing treatment energy, wherein the treatment energy may be used to obtain images. In such cases, in order to obtain imaging using treatment energies, the imager 80 may be configured to generate images in response to radiation having treatment energies (e.g., a MV imager). In some example embodiments, the treatment energy may be about 160 kilo-electron-volts (keV) or greater, for example, about 1 mega-electron-volts (MeV) or greater. Diagnostic energy may generally be below the high energy range, for example, below about 160 keV. In other example embodiments, the treatment energy and the diagnostic energy may have other energy levels, and refer to energies that are used for treatment and diagnostic purposes, respectively.

The radiation source 22 may generate X-ray radiation at a plurality of photon energy levels within a range between about 10 keV and about 20 MeV. In further example embodiments, the radiation source 22 may be a diagnostic radiation source. In such cases, the radiation treatment system 10 may be a diagnostic system with one or more moving parts. In the example embodiment shown in FIG. 1A, the radiation source 22 is carried by the gantry 12. Alternatively, the radiation source 22 may be located within a bore (e.g., coupled to a ring gantry).

Still referring to FIG. 1A, the control system 18 includes processing circuitry 54, such as one or more processors and memory, coupled to a controller 40. The control system 18 may also include a monitor 56 for displaying data and an input device 58, such as a keyboard and/or a mouse, for inputting data and/or control commands (e.g., for controlling one or more voltage regulator circuits). The controller 40 may control operation of the radiation source 22 and the gantry 12. For example, the controller 40 may provide power and timing signals to the radiation source 22 and control a rotational speed and position of the gantry 12, based on signals received from the processing circuitry 54. The controller 40 may also control operation of an electron gun, a modulator (e.g., a solid-state modulator) and/or a voltage regulator circuit described herein.

Although the controller 40 is shown as a separate component from the gantry 12 and the processing circuitry 54, in alternative example embodiments, the controller 40 may be a part of the gantry 12 or the processing circuitry 54.

The radiation treatment system 10 may be configured to deliver a treatment radiation beam towards the patient 20 at different gantry angles, During a treatment procedure, the radiation source 22 rotates around the patient 20 and delivers a treatment radiation beam from different gantry angles towards the patient 20. While the radiation source 22 is at different gantry angles, the collimator 24 is operated to change the shape of the beam to correspond with a shape of the target tissue structure. For example, the collimator 24 may be operated so that the shape of the beam is similar to a cross sectional shape of the target tissue structure. In another example, the collimator 24 may be operated so that different portions of the target tissue structure receive different amounts of radiation (e.g., as in an intensity-modulated radiation therapy (IMRT) procedure).

Figure 1B:
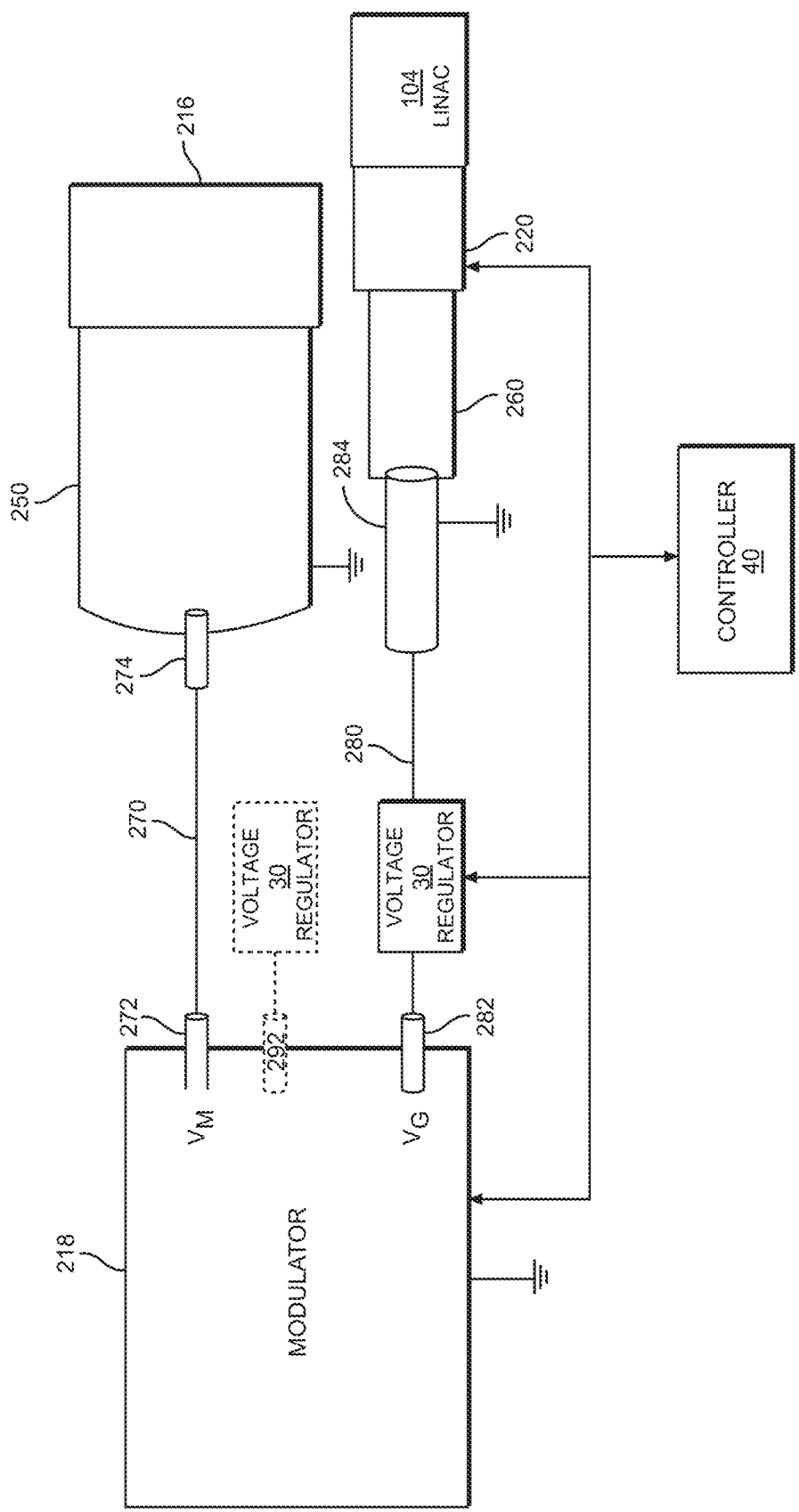
FIG. 1B is a simplified, schematic diagram illustrating an example configuration of a portion of the radiation system shown in FIG. 1A.

FIG. 1B is a simplified, schematic block diagram illustrating a portion of the radiation treatment system of FIG. 1A.

Referring to FIG. 1B, the radiation treatment system 10 includes a radiation source (e.g., radiation source 22 in FIG. 1A) having an electron gun 220 and a magnetron 216 coupled to a modulator 218. In one example, the modulator 218 may be a solid-state modulator. However, example embodiments should not be limited to this example.

The electron gun 220 is configured to inject particles such as electrons into a linear accelerator (LINAC) 104. The modulator 218 is configured to output respective voltages $V_M$ (magnetron voltage) and $V_G$ (electron gun voltage) for operation of the magnetron 216 and the electron gun 220, respectively. Although example embodiments will be discussed with regard to an electron gun 220, example embodiments should not be limited to this example. Rather, example embodiments may be applicable to other particle sources.

Figure 2:
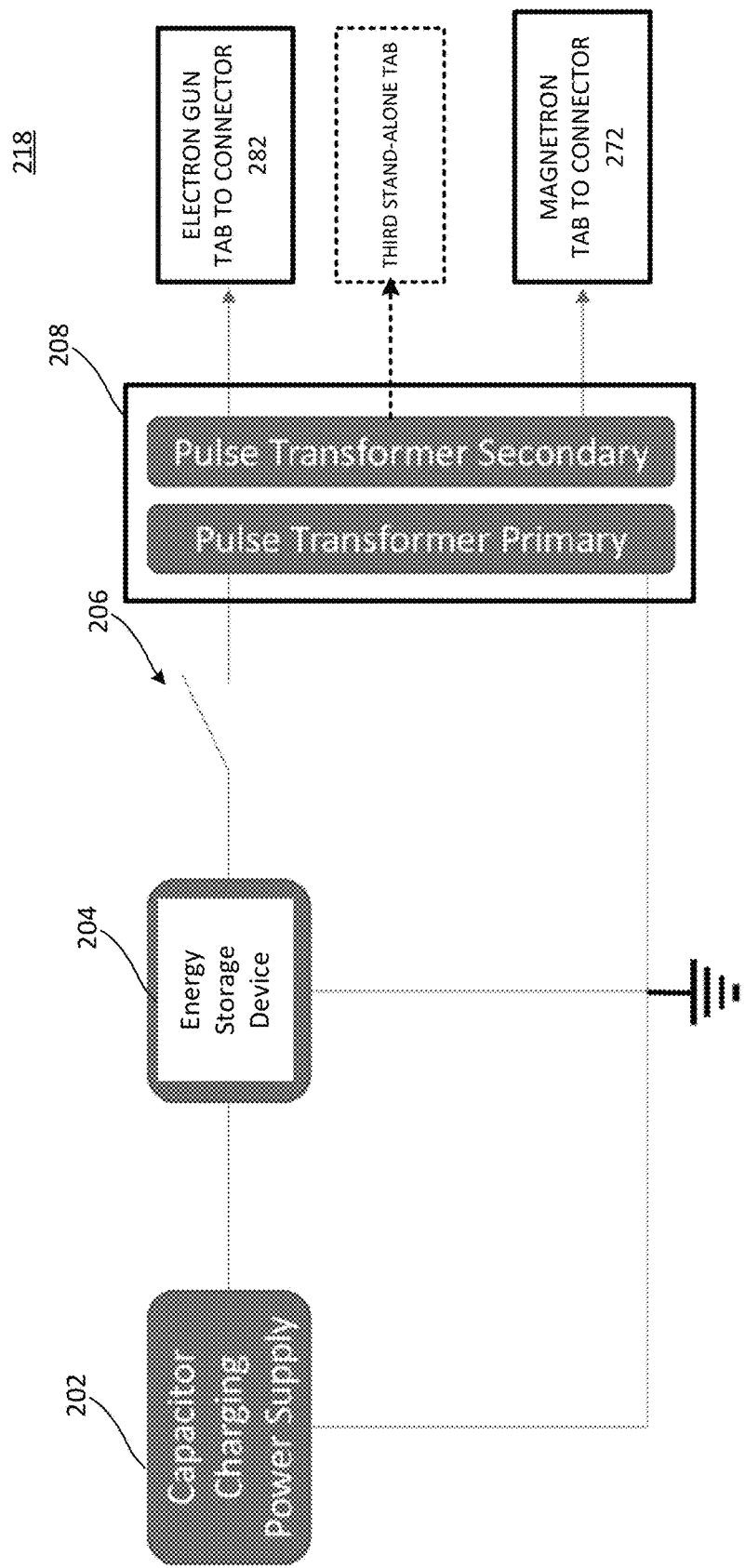
FIG. 2 is a schematic diagram of an example embodiment of the modulator shown in FIG. 1B.

FIG. 2 is a schematic diagram of an example embodiment of the modulator 218 shown in FIG. 1B.

Referring to FIG. 2, the modulator 218 includes a charging power supply 202, an energy storage device 204, one or more switches 206, and a step-up pulse transformer 208. In one example, the energy storage device 204 may be a capacitor bank including a plurality of capacitors (not shown) and/or the one or more switches 206 may be solid state switches. However, example embodiments should not be limited to this example. The step-up pulse transformer 208 includes a primary and a secondary pulse transformer.

In example operation, the modulator 218 delivers relatively high voltage pulses to the magnetron 216 and the electron gun 220 by charging the energy storage device 204 and then using the one or more switches 206 to rapidly discharge stored energy through the step-up pulse transformer 208. According to one or more example embodiments, the modulator (e.g., a single solid-state modulator) 218 powers both the magnetron 216 and the electron gun 220 by using an electron gun tab and a magnetron tab (two different tabs) on the same secondary winding of the step-up pulse transformer 208. The electron gun tab is connected to the first connector 282 and the magnetron tab is connected to the first connector 272 in FIG. 1B.

Returning to FIG. 1B, during use, the LINAC 104 is excited by power delivered by the magnetron 216 at a frequency, for example, between about 1000 MHz and about 20 GHz (e.g., between about 2800 and about 3000 MHz). In other example embodiments, the magnetron 216 may have other configurations and/or may be configured to provide power at other frequencies. The power delivered by the magnetron 216 may be in the form of electromagnetic waves. The electrons generated by the electron gun 220 are accelerated through the LINAC 104 by oscillations of the electromagnetic fields within the cavities (not shown) of the LINAC 104, thereby resulting in a high energy electron beam, which may strike a target downstream to produce radiation with certain desired characteristics. The radiation exits from the radiation source 22 of FIG. 1A, and may then be collimated by the collimator 24 to shape the radiation into a radiation beam with a certain desired shape. Although example embodiments are discussed herein with regard to a magnetron, example embodiments may be applicable to other types of power sources, such as a klystron, or any microwave source (e.g., pulsed high-power microwave source).

Still referring to FIG. 1B, the modulator 218 is connected to a first apparatus 250 for providing electromagnetic interference (EMI) containment at the interface between the magnetron 216 and first cable 270. The modulator 218 is also connected to a second apparatus 260 for providing electromagnetic interference containment at the interface between the electron gun 220 and second cable 280. In some example embodiments, the modulator 218 is configured to provide a −45 kV, 4.5 µS, 105A pulse to the magnetron 216, and also to provide a −27 kV, 4.5 µS, 0.5 A pulse to the electron gun 220 via respective high voltage socket terminals at the modulator 218. These pulses are provided to the magnetron 216 and the electron gun 220 via respective shield high voltage cables (the first cable 270 and second cable 280), which plug into the sockets of the modulator 218 with mating high voltage connectors. In other example embodiments, the pulses provided to the magnetron 216 and to the electron gun 220 may have other characteristics (e.g., energy level, amplitude level, pulse width, etc.) that are different from those described herein.

In example operation, the first cable 270 is configured to receive a high voltage pulse from the modulator 218 and transmit the high voltage pulse to the magnetron 216. Similarly, the second cable 280 is configured to receive a high voltage pulse from the modulator 218, and transmit the high voltage pulse to the electron gun 220.

A voltage regulator circuit 30 (also referred to as an electron gun voltage regulator circuit) is electrically connected between the modulator 218 and the electron gun 220 to control the voltage applied to the electron gun 220 and/or the magnetron 216. In one example, the voltage regulator circuit 30 is electrically connected to, or taps, the second cable 280 upstream of the second apparatus 260 between the modulator 218 and the electron gun 220. The voltage regulator circuit 30 may also be referred to as an electron gun voltage regulator or electron gun voltage regulator circuit, and will be discussed in more detail later.

As mentioned above, to contain electromagnetic interference from the transmission of the high voltage via the first cable 270, the first apparatus 250 is provided at the interface between the first cable 270 and the magnetron 216. Similarly, to contain electromagnetic interference from the transmission of the high voltage by the second cable 280, the second apparatus 260 for containing electromagnetic interference is provided at the interface between the second cable 280 and the electron gun 220.

In some embodiments, the first apparatus 250 includes a cage for EMI containment, and the second apparatus 260 includes an electron gun shield also for EMI containment.

Figure 1C:
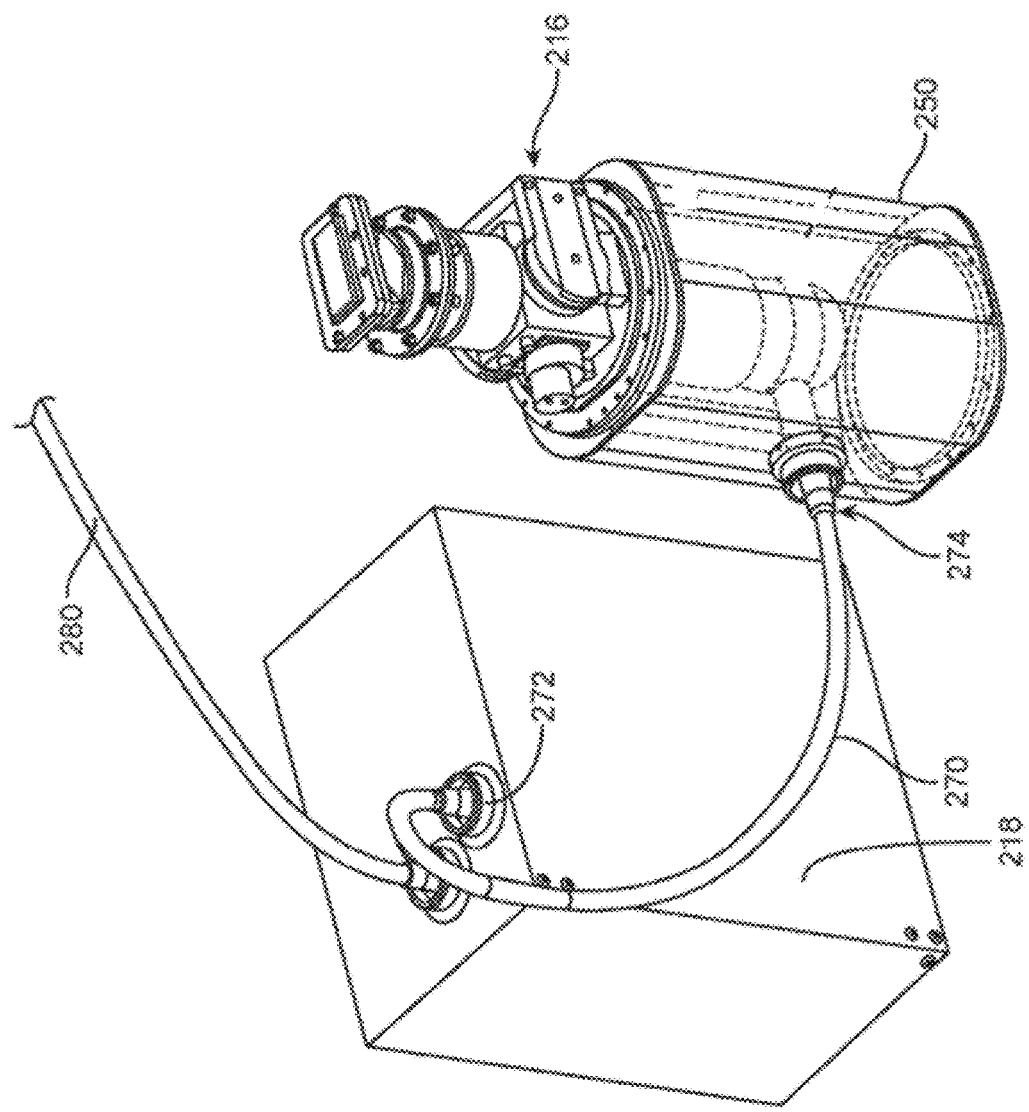
FIG. 1C illustrates an example embodiment of the first apparatus shown in FIG. 1B.

FIG. 1C illustrates an example embodiment of the first apparatus 250 shown in FIG. 1B.

As shown in FIG. 1C, the first apparatus 250 provides electromagnetic interference containment at the interface between the first cable 270 and the magnetron 216. The first apparatus 250 is configured to contain the electromagnetic interference resulting from the transmission of high energy pulses by the first cable 270. An example of the first apparatus 250 is discussed in more detail in U.S. Pat. No. 10,546,711, the entire contents of which are incorporated herein by reference.

Figure 1D:
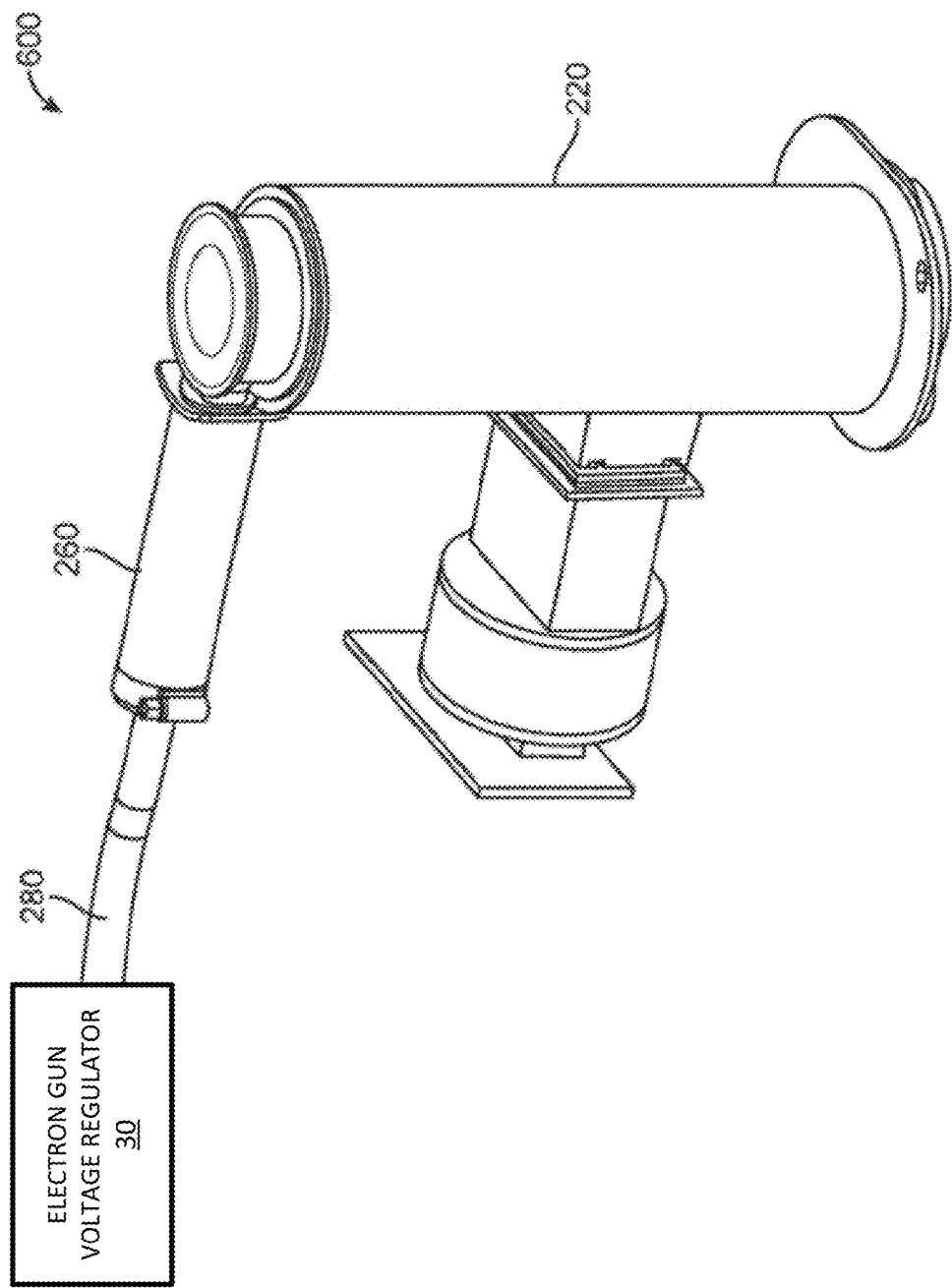
FIG. 1D illustrates an example embodiment of the second apparatus shown in FIG. 1B.

FIG. 1D illustrates a cable-to-electron gun interface 600 that includes the second apparatus 260 for providing EMI containment around the feed-through of an electron gun 220. As shown, the second apparatus 260 is configured to couple to an input connection (feed-through) of the electron gun 220. An example of the second apparatus 260 is also discussed in more detail in U.S. Pat. No. 10,546,711.

Returning to FIG. 1B, the modulator 218 is connected to the first apparatus 250 via the first cable 270 having a first connector 272 and a second connector 274. The first connector 272 of the first cable 270 is configured to couple to a corresponding connector at the modulator 218. The second connector 274 of the first cable 270 is configured to connect to the first apparatus 250. In at least this example embodiment, the first connector 272 of the first cable 270 is detachably coupled to the connector at the modulator 218, and the second connector 274 of the first cable 270 is detachably coupled to the first apparatus 250. In other embodiments, the first connector 272 may be fixedly or permanently coupled to the connector at the modulator 218, and/or the second connector 274 may be fixedly or permanently coupled to the first apparatus 250.

The modulator 218 is connected to the second apparatus 260 via the second cable 280 having a first connector 282 and a second connector 284. The first connector 282 of the second cable 280 is configured to couple to a corresponding connector at the modulator 218. The second connector 284 of the second cable 280 is configured to connect to the second apparatus 260.

In one example, the cables 270 and 280 may be flexible. Each of the cables 270 and 280 may be configured to hold off about 75 kV (or other values) DC, and may be shielded by an external braided shield.

As mentioned above, the voltage regulator circuit 30 is electrically connected between the modulator 218 and the electron gun 220 to control a magnitude of the voltage applied to the electron gun 220 and/or the magnetron 216. In the example embodiment shown in FIG. 1B, the voltage regulator circuit 30 may be a relatively compact electron gun voltage regulator circuit placed in line between the modulator 218 and the electron gun 220.

The voltage regulator circuit 30 may also provide a voltage clamping function for the electron gun 220, which may extend to the magnetron 216 as a result of, for example, coupling through the transformer coil. As a result, a single voltage regulator circuit electrically connected between the modulator 218 and the electron gun 220 may protect both the electron gun 220 and the magnetron 216 (e.g., from voltage spikes).

Although the example embodiment shown in FIG. 1B includes a voltage regulator circuit connected between the modulator 218 and the electron gun 220, example embodiments should not be limited to this example. Rather, as discussed in more detail later, one or more voltage regulator circuits may be connected between the modulator 218 and the magnetron 216 or between the modulator 218 and the magnetron 216 and between the modulator 218 and the electron gun 220 to control a magnitude of the voltage output from the modulator 218 for operation of the magnetron 216 and/or the electron gun 220. Thus, according to one or more example embodiments, the radiation treatment system 10 may include at least one voltage regulator circuit electrically connected between the modulator 218 and at least one of the magnetron 216 or the electron gun 220, wherein the at least one voltage regulator circuit is configured to control a magnitude of the voltage output from the modulator 218 for operation of the magnetron 216 and the electron gun 220.

In addition, as shown in FIG. 1B, the voltage regulator circuit 30 may be connected to a third (stand-alone) tab 292 from the modulator transformer winding, since the clamping of the voltage spike may couple into the other devices (e.g., electron gun, magnetron, etc.). The third tab 292 may be beneficial at a lower voltage location along the secondary to suppress and/or minimize required voltage ratings.

Configuration and functionality of example embodiments of the voltage regulator circuit 30 and radiation systems including the same, will now be discussed in some detail, with more detailed discussion of voltage regulator circuits, according to example embodiments, provided later.

Figure 3:
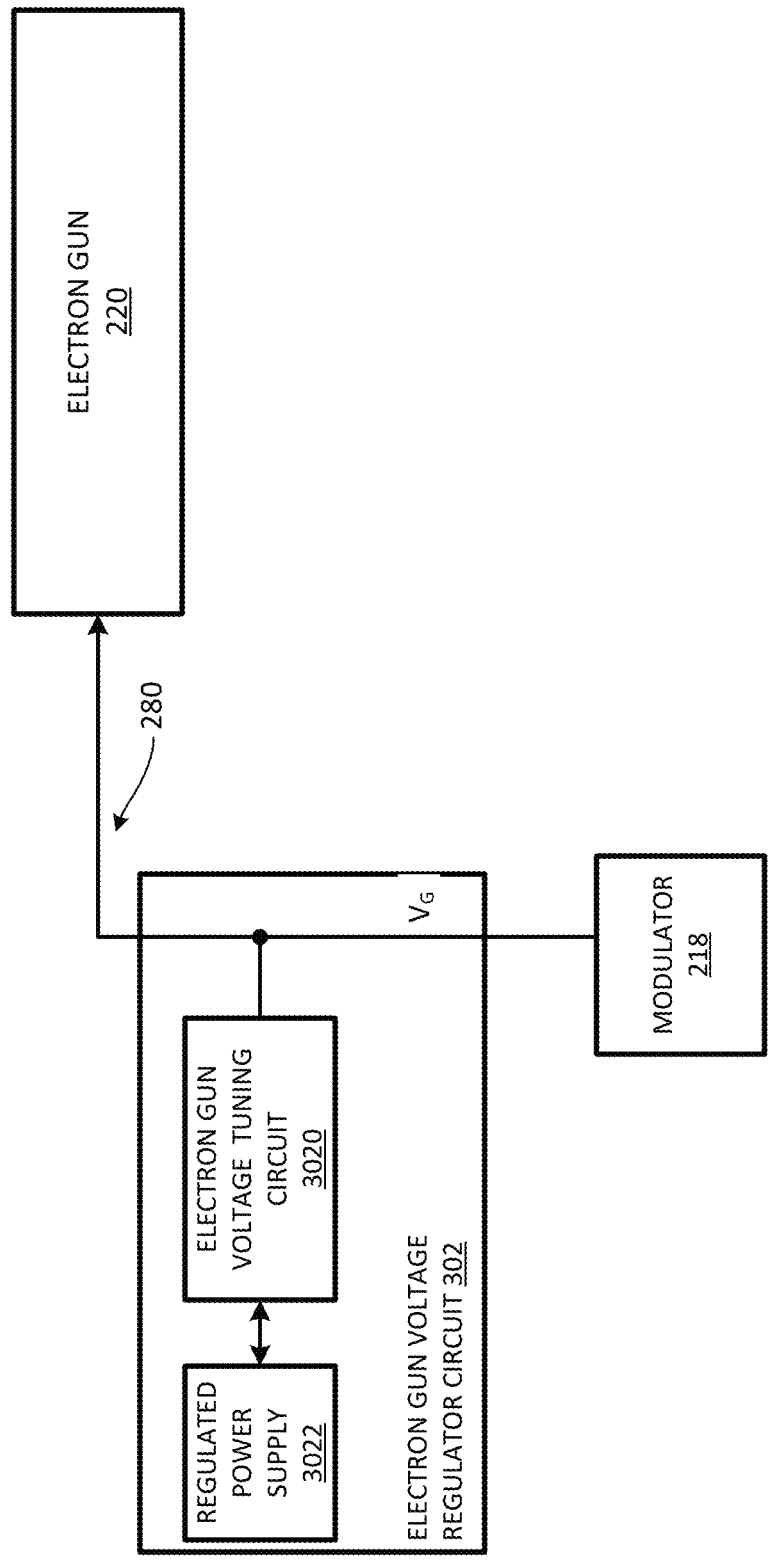
FIG. 3 is a simplified, schematic block diagram illustrating a portion of the radiation system shown in FIGS. 1A and 1B, according to example embodiments.

FIG. 3 is a simplified, schematic block diagram illustrating a portion of the radiation system shown in FIGS. 1A and 1B, according to example embodiments.

Referring to FIG. 3, the portion of the radiation system includes a voltage regulator circuit 302 electrically connected between the electron gun 220 and the modulator 218. The voltage regulator circuit 302 includes a voltage tuning circuit 3020 electrically connected to a regulated power supply 3022. The voltage tuning circuit 3020 and the regulated power supply 3022 will be discussed in more detail later.

In operation, as mentioned above, the voltage regulator circuit 302 is configured to control (e.g., limit or downregulate) a magnitude of the voltage output from the modulator 218 for operation of the electron gun 220 and/or the magnetron 216. The voltage regulator circuit 302 may control the magnitude of the voltage output from the modulator 218 by diverting current from the electron gun 220 to a charge storage circuit (e.g., one or more storage capacitors) within the voltage tuning circuit 3020.

In more detail, for example, when the magnitude of the negative voltage pulse output from the modulator 218 exceeds the magnitude of the negative bias voltage (e.g., about −29 kV) within the voltage regulator circuit 302, the voltage regulator circuit 302 diverts excess current into the charge storage circuit thereby limiting the voltage applied at the electron gun 220. By diverting the charge from the electron gun 220, the voltage regulating circuit 302 may also limit the voltage reached at the magnetron 216, without being electrically connected to the cable connecting the modulator 218 and the magnetron 216.

The voltage regulator circuit 302 may also tune the voltage output from the modulator 218 for operation of the electron gun 220 independent of the voltage output from the modulator 218 for operation of the magnetron 216. For example, the regulated power supply 3022 may apply an adjustable bias voltage to the voltage tuning circuit 3020 to tune the voltage output from the modulator 218 for operation of the electron gun 220. The controller 40 may control the bias voltage output from the regulated power supply 3022 based on, for example, input from a user via an external user interface or input device.

More detailed example embodiments of voltage regulating circuits and components thereof will now be described with regard to FIGS. 4, 5, 10, 12 and 14. As will be discussed in more detail later, according to one or more example embodiments, the regulated power supply 3022 may be omitted and/or the voltage regulator circuit may further include a discharge circuit (e.g., a fast discharge circuit).

Figure 4:
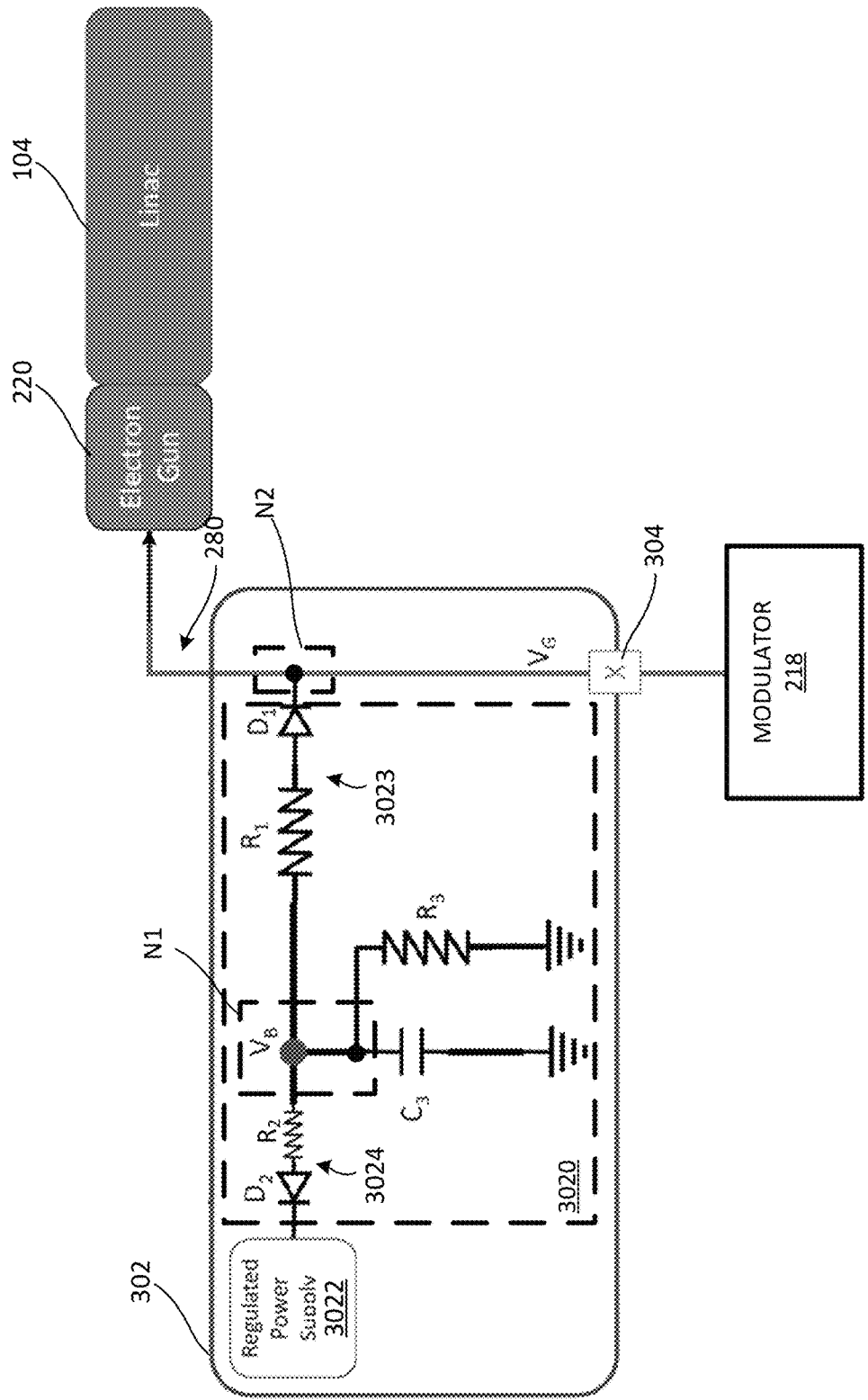
FIG. 4 illustrates a voltage regulator circuit according to example embodiments.

FIG. 4 illustrates an example embodiment of the voltage regulator circuit 302, and components thereof, in more detail. In this example, the voltage regulator circuit 302 utilizes one or more reverse biased high voltage diodes. However, example embodiments should not be limited to this example.

Referring to FIG. 4, as mentioned above, the voltage regulator circuit 302 includes the voltage tuning circuit 3020 and the regulated power supply 3022.

The regulated power supply 3022 may be a relatively low power (e.g., approximately 100 W) DC regulated power supply configured to provide a negative bias voltage $V_B$ of about −29 kV.

The voltage tuning circuit 3020 includes diode-resistor pair circuits 3023 and 3024, resistor $R_3$ and a capacitor $C_3$. The capacitor $C_3$ functions as a charge storage circuit. Although discussed with regard to capacitor $C_3$ for example purposes, example embodiments should not be limited to this example. Rather, other charge storage circuits (e.g., including one or more capacitors) may also be used.

The diode-resistor pair circuit 3023 includes a diode $D_1$ and a resistor $R_1$ electrically connected in series with one another. The diode-resistor pair circuit 3024 includes a diode $D_2$ and a resistor $R_2$ electrically connected in series with one another. In one example embodiment, diodes $D_1$ and $D_2$ may each be rated to about 40 kV, have a rise time of about 100 ns and be configured to handle surge currents up to about 3 Amps.

The diode-resistor pair circuit 3024 is connected between the regulated power supply 3022 and a first node N1. In more detail, the cathode of the diode $D_2$ is connected to the regulated power supply 3022 and the anode of the diode $D_2$ is connected to a first terminal of the resistor $R_2$. A second terminal of the resistor $R_2$ is connected to a first terminal of the capacitor $C_3$ and a first terminal of the resistor $R_3$ at the first node N1. A second terminal of the capacitor $C_3$ and a second terminal of the resistor $R_3$ are connected to ground such that the capacitor $C_3$ and the resistor $R_3$ are electrically connected in parallel between the first node N1 and ground.

The diode-resistor pair circuit 3023 is connected between the first node N1 and a second node N2. In more detail, a first terminal of the resistor $R_1$ is connected to the anode of the diode $D_2$, the first terminal of the capacitor $C_3$ and the first terminal of the resistor $R_3$ at the first node N1. A second terminal of the resistor $R_1$ is connected to an anode of the diode $D_1$. The cathode of the diode $D_1$ is connected to the second node N2.

The second node N2 is between the electron gun 220 and the electron gun tab of the modulator 218.

Still referring to FIG. 4, a source impedance 304 of the modulator 218 may be present between the electron gun tab and the second node N2. Although discussed with regard to a source impedance, example embodiments should not be limited to this example. Rather, according to one or more other example embodiments (e.g., for higher power applications), a current and/or voltage limiting device (e.g., a relatively small pulse transformer with a core that saturates at a threshold power level) may be positioned at 304. In yet another example, a relatively low inductance resistor may be positioned at 304 in FIG. 4.

In example operation, when the modulator 218 is not outputting voltage pulses (e.g., not pulsing), the first diode $D_1$ insulates the electron gun 220 from the applied bias voltage $V_B$ (from the regulated power supply 3022) at the first node N1 so that the bias voltage $V_B$ has no impact on the electron gun 220 and the electron gun remains "off."

When activated, the modulator 218 outputs a negative voltage pulse to the electron gun 220. When the magnitude of the negative voltage pulse output from the modulator 218 exceeds the magnitude of the negative bias voltage $V_B$ (e.g., about −29 kV), the diode $D_1$ turns on to divert excess current into the charge storage circuit (e.g., capacitor $C_3$) and control a magnitude of the voltage applied to the electron gun 220 and/or the magnetron 216. In so doing, diode $D_1$ functions similar to an overflow valve that conducts (e.g., only conducts) when a threshold voltage level is reached (e.g., bias voltage $V_B$ or about −26 kV). Accordingly, the electron gun voltage may be down-regulated, limited and/or capped by the negative bias voltage $V_B$. As long as the bias voltage $V_B$ is lower in magnitude (less negative) than the applied voltage $V_G$ from the modulator 218, the electron gun voltage may be adjustably down-regulated by controlling the bias voltage $V_B$ at the regulated power supply 3022 (e.g., via the controller 40).

Still referring to FIG. 4, the first resistor $R_1$ protects the diode $D_1$ by limiting the current therethrough. In at least one example, the first resistor $R_1$ may have a resistance of about 100Ω to limit the current through the first diode $D_1$ to about 10 A if the electron gun voltage $V_G$ reaches about −27 kV.

Capacitor $C_3$ may be sized to provide a rise time above about 10 microseconds so that the capacitor $C_3$ may absorb all or substantially all diverted current from a single electron gun pulse. In one example, the capacitor $C_3$ may be about 10 nF.

After the electron gun pulse, which may last about 4-5 μs, the capacitor $C_3$ may bleed the acquired charge to ground through bleed resistor $R_3$.

The bleed resistor $R_3$ may be small enough so that the diverted current may be disposed between electron gun pulses, but large enough to suppress and/or minimize bleeding from the regulated power supply 3022. In one example, for an electron gun duty cycle (pulse duration*pulse repetition rate) of about 0.001, the resistance of the bleed resistor $R_3$ may be about 30 MΩ (30 kV/1 mA), such that the bleed resistor $R_3$ is able to direct 1 A from the gun cable by bleeding an average current of 1 mA.

Notably, according to at least some example embodiments, the RC time constant need not be utilized here to determine the resistance of the bleed resistor $R_3$ since the goal is not necessarily to discharge the capacitor $C_3$, but rather match the bleed current through the bleed resistor $R_3$ to the time averaged current through the first resistor $R_1$, while maintaining a constant or substantially constant bias voltage on the capacitor $C_3$.

In the example discussed above, the regulated power supply 3022 need only require about 30 W to maintain the bias voltage $V_B$. However, example embodiments should not be limited to this example.

Still referring to FIG. 4, the diode $D_2$ and the resistor $R_2$ are arranged between the regulated power supply 3022 and the first node N1 to protect the regulated power supply 3022 from overvoltage coming from the second cable 280. The second resistor $R_2$ protects the diode $D_2$ by limiting the current in a manner similar or substantially similar to that discussed above with regard to resistor $R_1$ and diode $D_1$.

In the example shown in FIG. 4, as mentioned above, a maximum power of about 100 W from the regulated power supply 3022 is utilized to maintain the bias voltage $V_B$ at the first node N1. A mitigating factor is that the diode $D_2$ cuts off current from the regulated power supply 3022 when the capacitor $C_3$ has acquired charge from the second cable 280. As a result, power consumption from the regulated power supply 3022 may be reduced (e.g., significantly reduced) during operation of the radiation system, but may be relatively high (e.g., at a maximum) during standby. Moreover, when the radiation system is in standby, the regulated power supply 3022 may need to compensate for the leakage current through the bleed resistor $R_3$.

By providing a reverse bias voltage $V_B$ at the first node N1, the electron gun voltage $V_G$ may be downregulated in a more controlled manner. By downregulating the voltage applied to the electron gun 220, one or more example embodiments may also suppress and/or neutralize voltage spikes resulting from the pulse transformer at the modulator 218.

Figure 5:
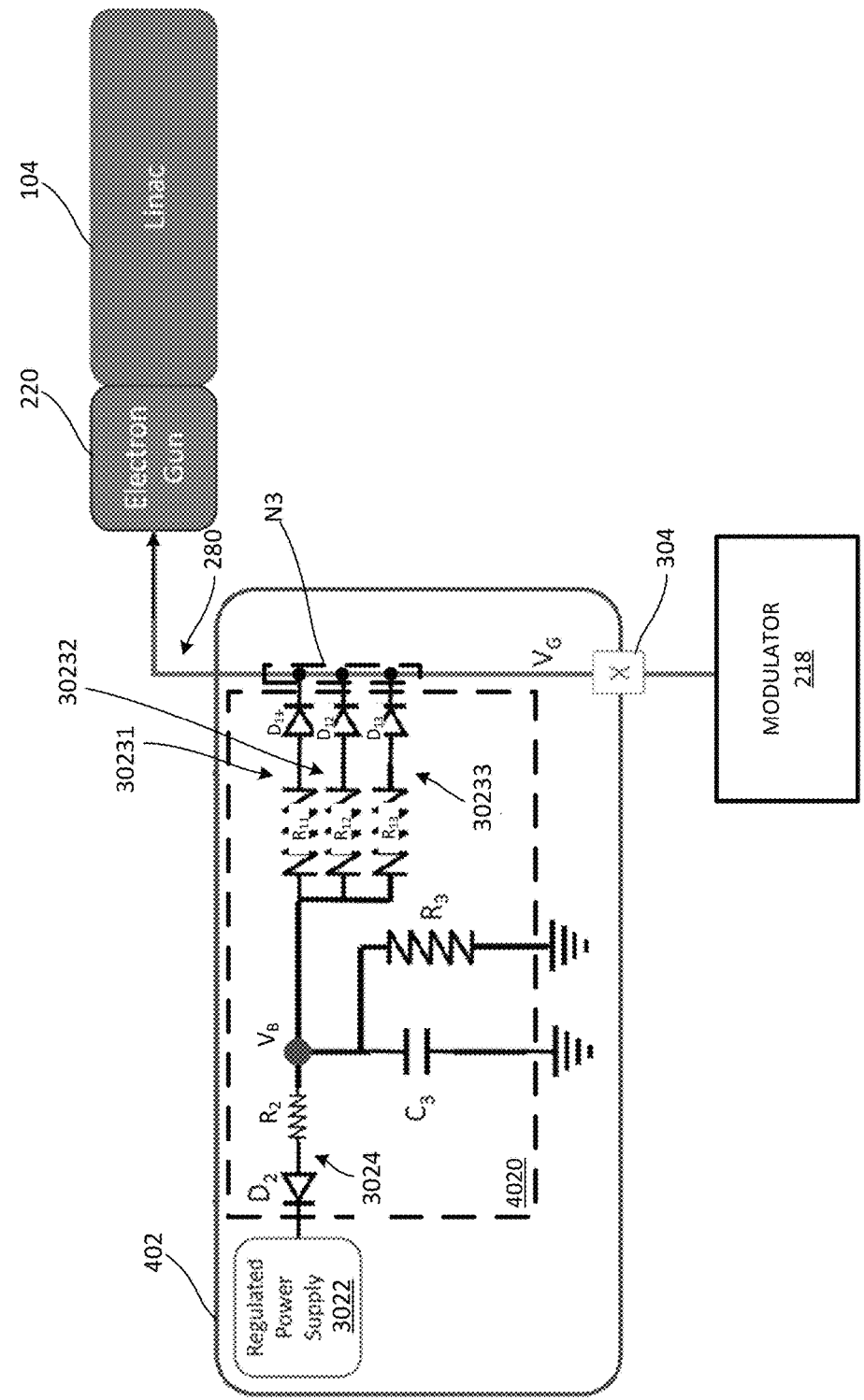
FIG. 5 illustrates another voltage regulator circuit according to example embodiments.

Limiting current through the diodes $D_1$ and/or $D_2$ may extend and/or ensure adequate lifetime of the diodes. In one example, limiting current through each of the diodes $D_1$ and $D_2$ to approximately 1 A may be sufficient to ensure adequate lifetime of the diodes. However, if conducting more than 1 A is desired, multiple diode-resistor pairs may be placed in parallel as shown in FIG. 5, for example.

Figure 10:
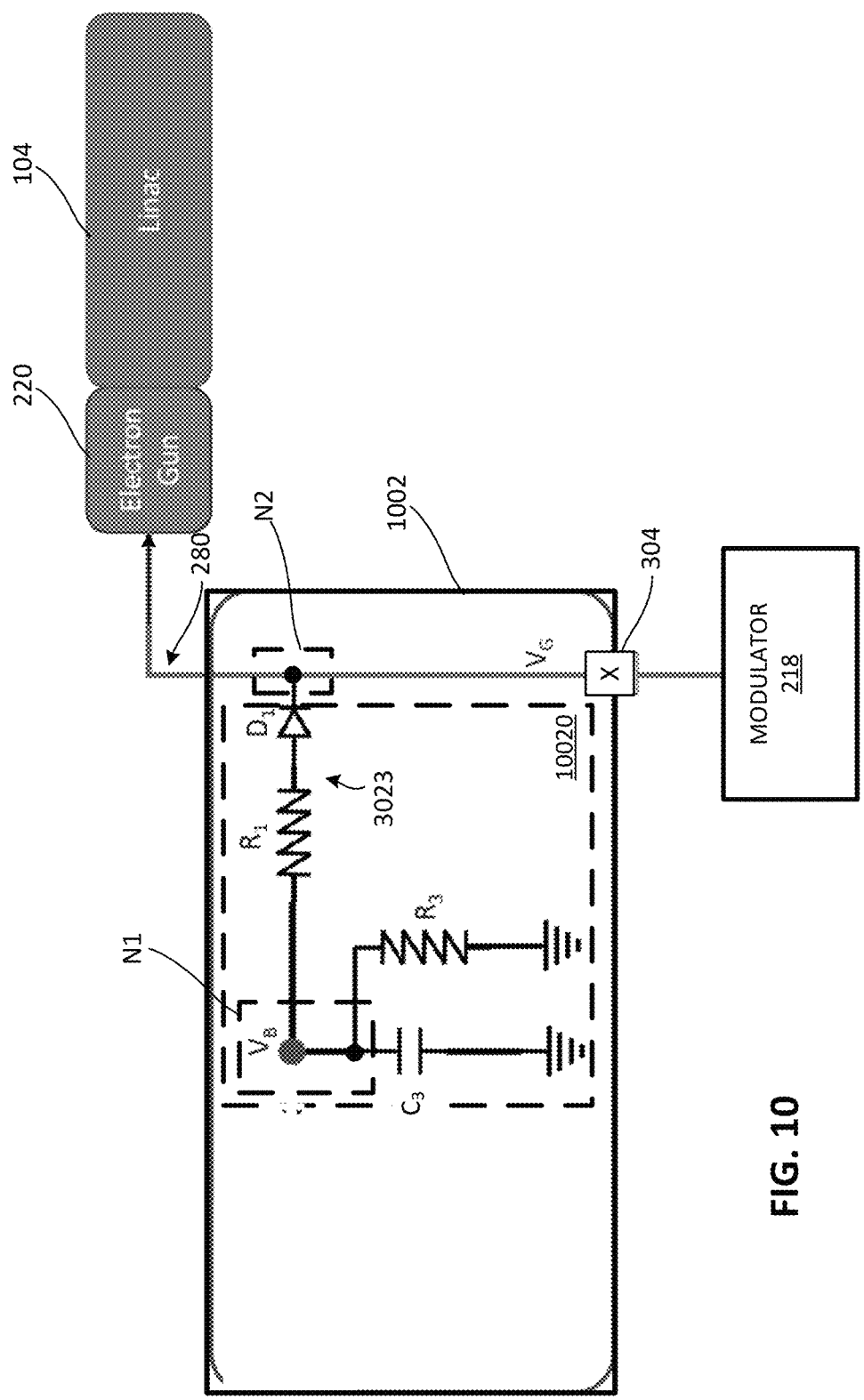
FIG. 10 illustrates another voltage regulator circuit according to example embodiments.

FIG. 10 illustrates another example embodiment of a voltage regulator circuit. The example embodiment shown in FIG. 10 is similar to that shown in FIG. 4, and thus, only differences between these embodiments will be discussed for the sake of brevity.

Referring to FIG. 10, the voltage regulator circuit 1002 includes a voltage tuning circuit 10020 but does not include the regulated power supply 3022 shown in FIG. 4. The voltage tuning circuit 10020 is similar to the voltage tuning circuit 3020 shown in FIG. 4, except that the voltage tuning circuit 10020 does not include the diode-resistor pair circuit 3024 shown in FIG. 4.

The voltage regulator circuit 1002 operates in the same or substantially the same manner as the voltage regulator circuit 302 shown in FIG. 4, except that in the example embodiment shown in FIG. 10, the capacitor $C_3$ and the first node N1 are charged to the bias voltage $V_B$ by the modulator 218 by taking energy from an initial set of pulses of the modulator 218. In one example, the capacitor $C_3$ and the first node N1 may be charged by the first 10-12 modulator pulses during a pre-charge period or delay interval of less than about 50 milliseconds (e.g., about 36 milliseconds). The pre-charge or delay period may occur prior to operation of the electron gun 220 or the magnetron 216.

Figure 11:
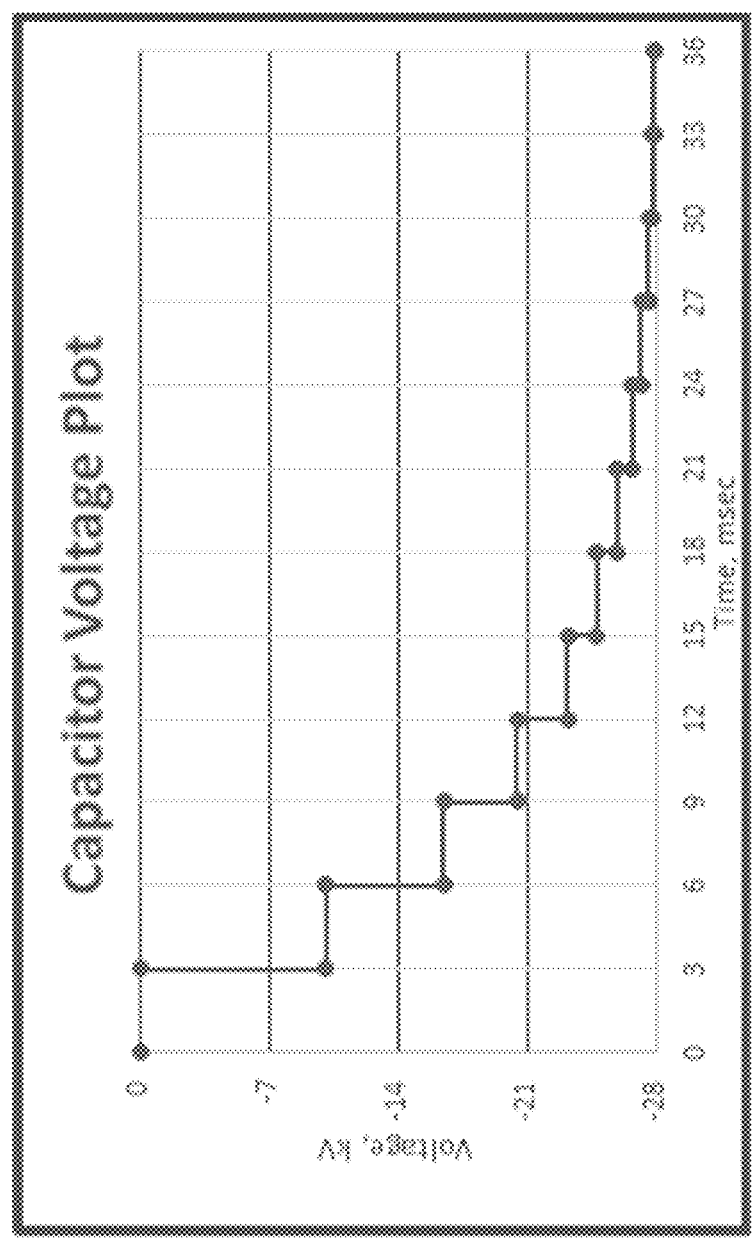
FIG. 11 is a graph illustrating example capacitor voltage as a capacitor is charged by initial pulses of the modulator, according to example embodiments.

FIG. 11 is a graph of voltage versus time illustrating example charging of a capacitor $C_3$, according to one or more example embodiments. As shown in FIG. 11, the capacitor $C_3$ charges to about −28 kV in about 36 milliseconds.

Figure 12:
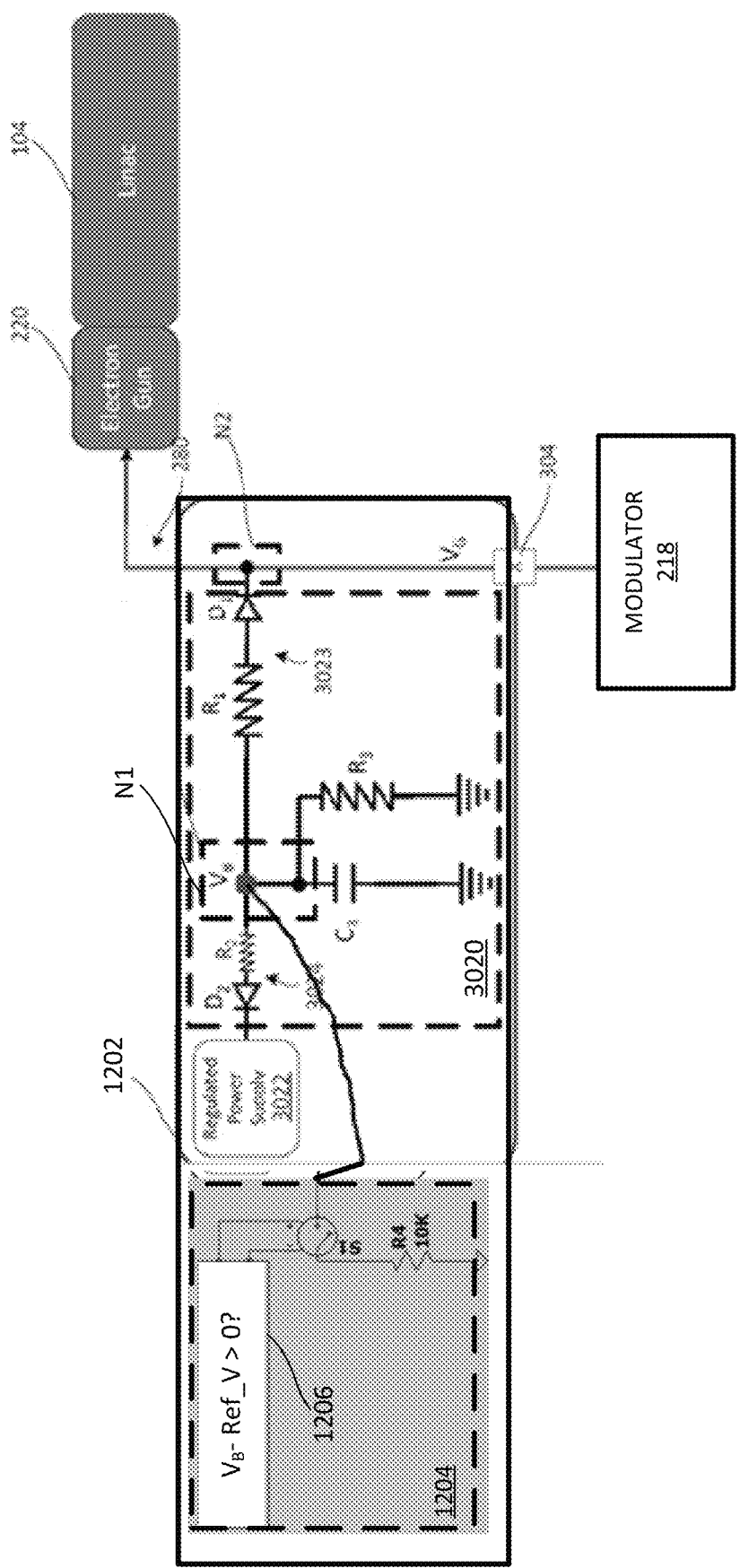
FIG. 12 illustrates another voltage regulator circuit according to example embodiments.

FIG. 12 illustrates yet another voltage regulator circuit 1202 according to example embodiments. The example embodiment shown in FIG. 12 is similar in configuration and operation to the example embodiment shown in FIG. 4, but the voltage regulator circuit 1202 further includes a discharge circuit (e.g., a fast discharge circuit) 1204. Because of similarities between these embodiments, only differences therebetween will be discussed.

Referring to FIG. 12, the discharge circuit 1204 is electrically connected to the first node N1. The discharge circuit 1204 is configured to discharge any overcharging of the capacitor $C_3$ above the voltage of the regulated power supply 3022 (e.g., about −28 kV).

The discharge circuit 1204 may include a switch S1, a resistor R4 (e.g., a 10 kΩ (resistor) and a controller 1206. The switch S1 may be or include one or more transistors or other switching devices. The controller 1206 may be, for example, processing or control circuitry such as, but not limited to, one or more processors, one or more Central Processing Units (CPUs), one or more microcontrollers, one or more arithmetic logic units (ALUs), one or more digital signal processors (DSPs), one or more field programmable gate arrays (FPGAs), one or more System-on-Chips (SoCs), one or more programmable logic units (PLUS), one or more microprocessors, one or more Application Specific Integrated Circuits (ASICs), or any other device or devices capable of responding to and executing instructions in a defined manner.

The resistor R4 is electrically connected between a first terminal of the switch S1 and ground. A second terminal of the switch S1 is electrically connected to the first node N1. The controller 1206 is electrically connected to, and configured to control, the switch S1.

In example operation, the controller 1206 is configured to determine whether the capacitor has been overcharged, and discharge the excess magnitude of voltage above a threshold voltage level Ref_V (e.g., about −28 kV). In one example, the controller 1206 may detect overcharging of the capacitor $C_3$ when the bias voltage $V_B$ (also the voltage at the capacitor $C_3$) exceeds a threshold level (e.g., when the difference between the bias voltage $V_B$ and the threshold voltage level Ref_V is greater than zero). In response to detecting that the capacitor $C_3$ is overcharged, the controller 1206 controls the switch S1 to connect the first node N1 to ground to discharge the capacitor $C_3$ until the bias voltage $V_B$ falls below the threshold level Ref_V. Once having detected that the bias voltage $V_B$ has fallen below the threshold level Ref_V, the controller 1206 controls the switch S1 to disconnect the first node N1 from ground, creating an open circuit between the node N1 and ground at the switch S1.

Figure 13:
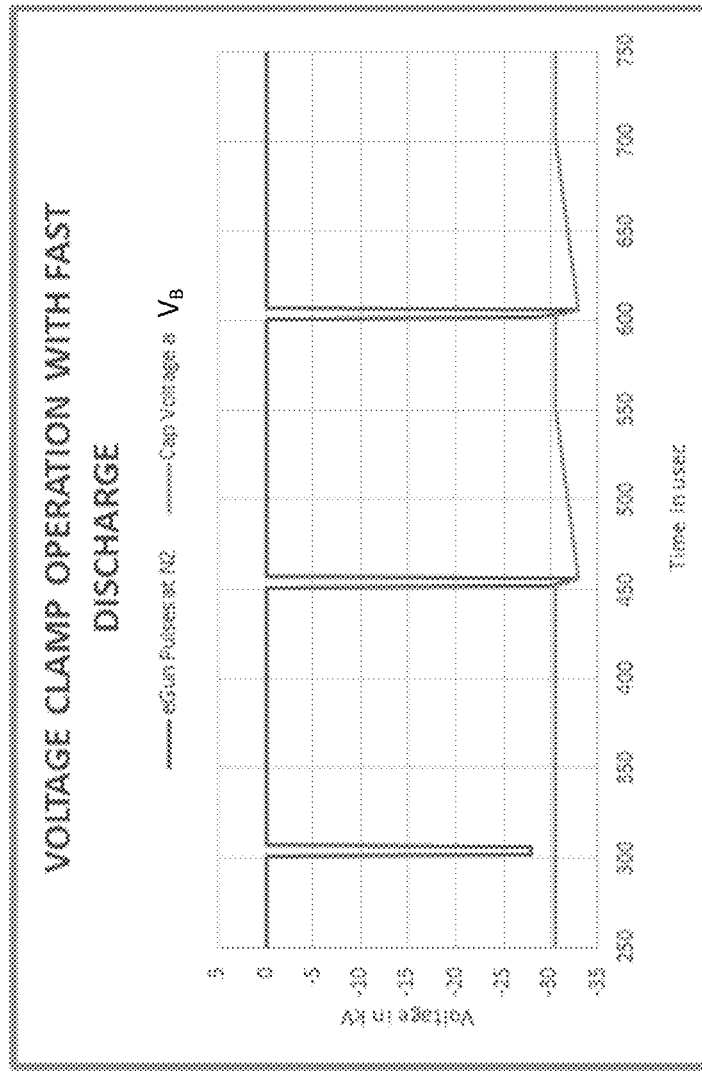
FIG. 13 is a graph illustrating example capacitor voltage as a capacitor is discharged by a discharge circuit, according to example embodiments.

FIG. 13 is a graph of voltage versus time for electron gun pulses at the second node N2 and the bias voltage $V_B$ at the first node N1 for the voltage regulator circuit 1202 shown in FIG. 12. As shown in FIG. 13, the discharge circuit 1204 discharges the capacitor $C_3$ between pulses from the electron gun 220 (e.g., by closing the switch S1 to connect the first node N1 to ground) as the moding causes overvoltage clamping.

Figure 14:
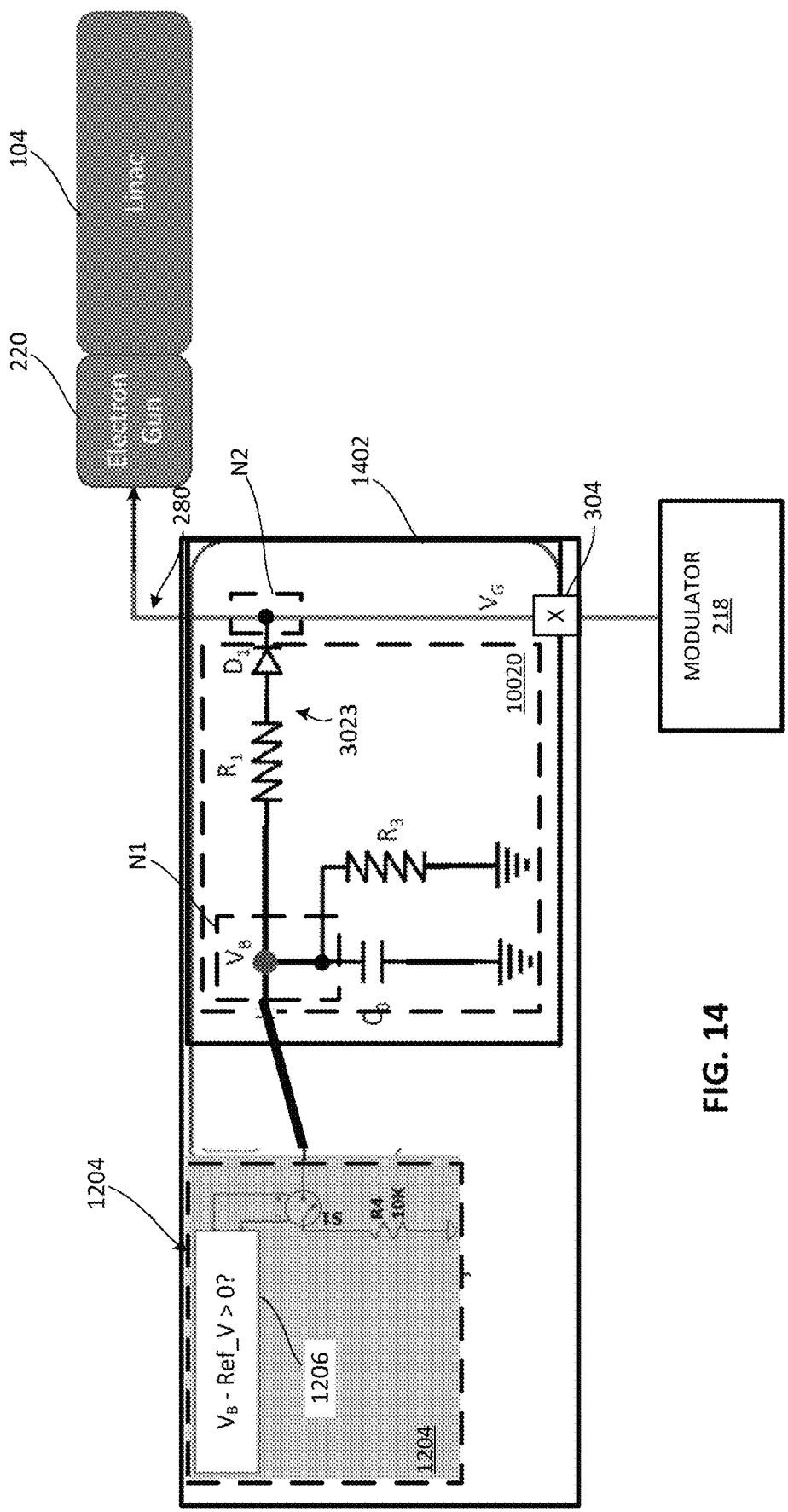
FIG. 14 illustrates another voltage regulator circuit according to example embodiments.

FIG. 14 illustrates yet another example embodiment of a voltage regulator circuit 1402. The example embodiment shown in FIG. 14 is similar in configuration and operation to that shown in FIG. 10, but the voltage regulator circuit 1402 further includes the discharge circuit (e.g., a fast discharge circuit) 1204 shown in FIG. 12. Because of similarities between these embodiments, only differences therebetween will be discussed. Moreover, because the discharge circuit 1204 is discussed above with regard to FIG. 12, only a brief discussion will be provided with regard to the example embodiment shown in FIG. 14.

Referring to FIG. 14, as with the example embodiment shown in FIG. 10, the capacitor $C_3$ is charged to the bias voltage $V_B$ by the modulator 218 by taking energy from an initial set of modulator pulses. Moreover, as in FIG. 12, the discharge circuit 1204 is electrically connected to the first node N1, and the discharge circuit 1204 is configured to discharge any overcharging of the capacitor $C_3$ above the threshold voltage Ref_V. The controller 1206 may detect overcharging of the capacitor $C_3$ in the same or substantially the same manner as discussed above with regard to FIG. 12.

In response to detecting that the capacitor $C_3$ is overcharged, the controller 1206 controls the switch S1 to connect the first node N1 to ground to discharge the capacitor $C_3$ until the bias voltage $V_B$ falls below the threshold level Ref_V. Once having detected that the bias voltage $V_B$ has fallen below the threshold level Ref_V, the controller 1206 controls the switch S1 to disconnect the first node N1 from ground, creating an open circuit between the node N1 and ground.

Figure 15:
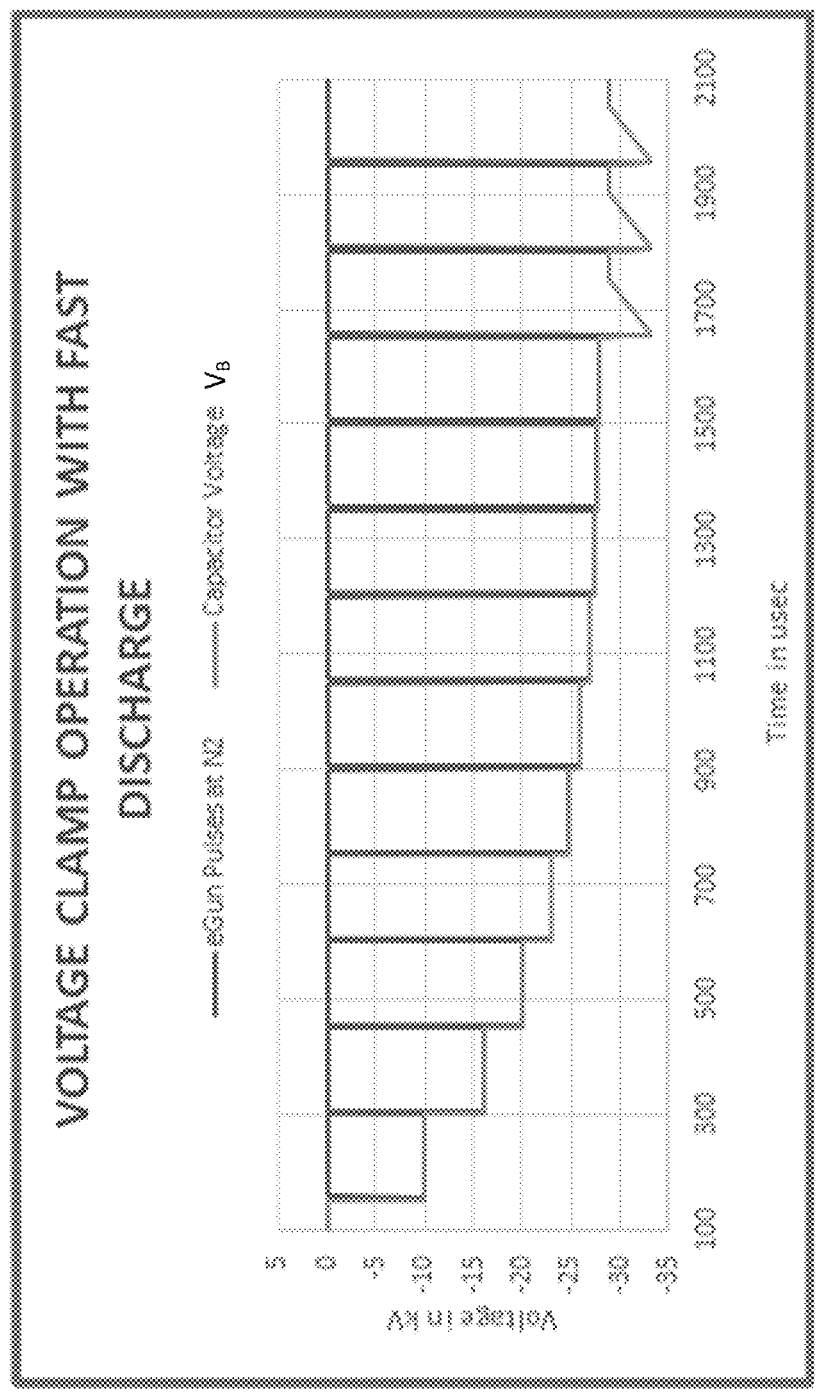
FIG. 15 is a graph illustrating example capacitor voltage as a capacitor is charged by initial pulses of the modulator and discharged by a discharge circuit, according to example embodiments.

FIG. 15 is a graph of voltage versus time for electron gun pulses at the second node N2 and the voltage $V_B$ at the first node N1 for the voltage regulator circuit 1402 shown in FIG. 14. As shown in FIG. 15, the discharge circuit 1204 discharges the capacitor $C_3$ between pulses from the electron gun 220 (e.g., by closing the switch S1 to connect the first node N1 to ground) as the moding causes overvoltage clamping.

Figure 9:
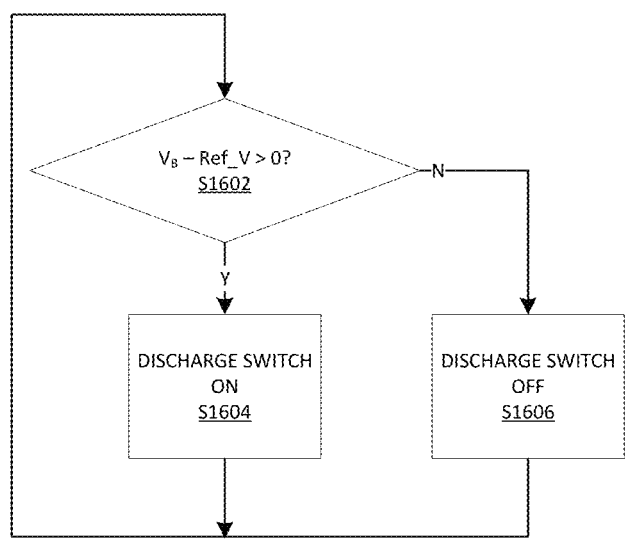
FIG. 9 is a flow chart illustrating a method according to example embodiments.

FIG. 9 is a flow chart illustrating a method of operation of the controller 1206 according to example embodiments. For example purposes, the example embodiment shown in FIG. 9 will be discussed with regard to the voltage regulator circuit shown in FIG. 12. However, example embodiments should not be limited to this example. Rather, the method shown in FIG. 9 may also be applicable to the example embodiment shown in FIG. 14.

Referring to FIG. 9, at S1602 the controller 1206 determines whether the capacitor $C_3$ has been overcharged (when the difference between the bias voltage $V_B$ and the threshold voltage level Ref_V is greater than zero).

In response to detecting that the capacitor $C_3$ is overcharged, at S1604 the controller 1206 controls the switch S1 to connect the first node N1 to ground (turns the switch S1 ON) to discharge the capacitor $C_3$. The process then returns to step S1602.

If the controller 1206 determines that the capacitor $C_3$ is no longer overcharged (the bias voltage $V_B$ at the first node N1 has fallen below the threshold level Ref_V), the controller 1206 controls the switch S1 to disconnect the first node N1 from ground (turns the switch S1 OFF). The process then returns to step S1602 at which the controller 1206 again determines whether the capacitor $C_3$ is overcharged.

The method shown in FIG. 9 may be performed periodically or continuously such that the controller 1206 periodically or continuously monitors the voltage of the capacitor $C_3$ to determine whether the capacitor $C_3$ is overcharged.

FIG. 5 illustrates another voltage regulator circuit 402 according to example embodiments. The example embodiment shown in FIG. 5 is similar to the example embodiment shown in FIG. 4, except that the voltage tuning circuit 4020 shown in FIG. 5 includes a plurality of diode-resistor pair circuits 30231, 30232 and 30233 rather than the diode-resistor pair circuit 3023. Because of the similarities between the example embodiments shown in FIGS. 4 and 5, only a discussion of the differences will be provided in detail. In FIG. 5, like reference characters refer to like elements, and thus, a detailed discussion for like elements is not repeated here.

Referring to FIG. 5, a plurality of diode-resistor pair circuits 30231, 30232 and 30233 are electrically connected in parallel with one another between the first node N1 and a third node N3. The modulator 218 and the electron gun 220 are also electrically connected to the third node N3 via the second cable 280.

The diode-resistor pair circuit 30231 includes a resistor Ru and a diode $D_{11}$ connected in series with one another between the first node N1 and the third node N3. In more detail, for example, a first terminal of the resistor Ru is connected to the first node N1 and a second terminal of the resistor Ru is connected to the anode of the diode $D_{11}$. The cathode of the diode Du is connected to the third node N3.

The diode-resistor pair circuit 30232 includes a resistor $R_{12}$ and a diode $D_{12}$ connected in series with one another between the first node N1 and the third node N3. In more detail, for example, a first terminal of the resistor $R_{12}$ is connected to the first node N1 and a second terminal of the resistor $R_{12}$ is connected to the anode of the diode $D_{12}$. The cathode of the diode $D_{12}$ is connected to the third node N3.

The diode-resistor pair circuit 30233 includes a resistor $R_{13}$ and a diode $D_{13}$ connected in series with one another between the first node N1 and the third node N3. In more detail, for example, a first terminal of the resistor $R_{13}$ is connected to the first node N1 and a second terminal of the resistor $R_{13}$ is connected to the anode of the diode $D_{13}$. The cathode of the diode $D_{13}$ is connected to the third node N3.

Although only three diode-resistor pair circuits are shown in FIG. 5, example embodiments should not be limited to this example. Rather, the voltage tuning circuit 4020 may include any suitable number of diode-resistor pair circuits depending on, for example, the amount of current to be conducted.

Although not shown specifically in FIG. 5, a plurality of resistor-diode pair circuits connected in parallel may also be utilized in place of the diode-resistor pair circuit 3024. The plurality of resistor-diode pair circuits may be the same or substantially the same as those discussed above.

Figure 6:
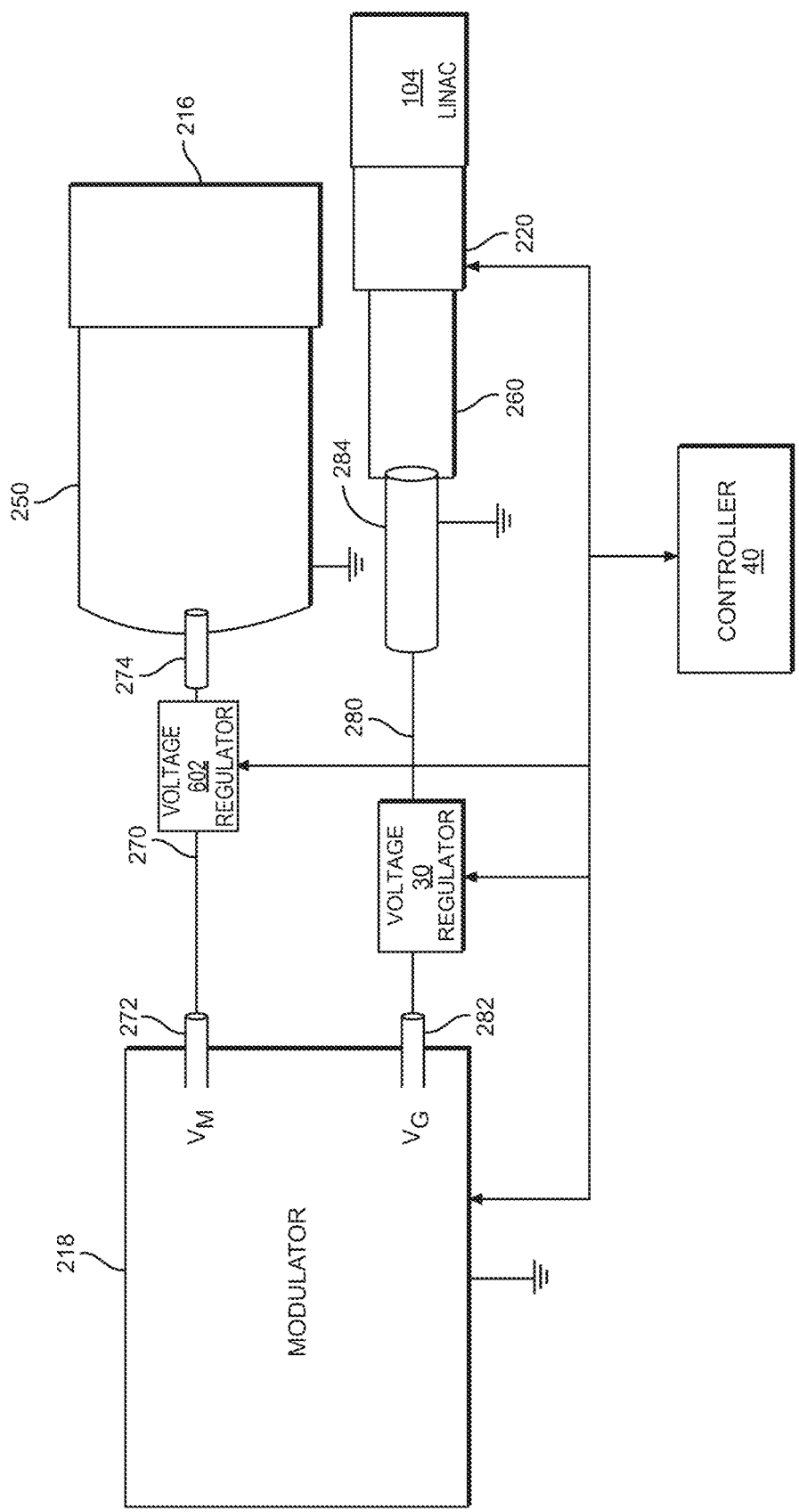
FIG. 6 is a simplified, schematic block diagram illustrating a portion of a radiation system, according to other example embodiments.

FIG. 6 is a simplified, schematic block diagram illustrating a portion of a radiation system, according to another example embodiment. The example embodiment shown in FIG. 6 is similar to the radiation system shown in FIG. 1B, but further includes a magnetron voltage regulator circuit 602 electrically connected between the modulator 218 and the magnetron 216. In FIG. 6, like reference characters refer to like elements previously described, and thus, a detailed discussion of these like elements is not repeated.

Referring to FIG. 6, the voltage regulator circuit 30 may be configured and function in the same or substantially the same manner as discussed above. Although the example embodiment shown in FIG. 6 is discussed with regard to the voltage regulating circuit 302 shown in FIG. 4, it should be understood that any other voltage regulator circuit discussed herein may also be used in place of the voltage regulator circuit 302.

As needed, the controller 40 may be configured to control the magnetron voltage regulator circuit 602 in the same or substantially the same manner as discussed above with regard to the voltage regulating circuit 302.

A detailed discussion of the magnetron voltage regulator circuit 602 and its functionality will be provided below with regard to FIG. 8.

Figure 7:
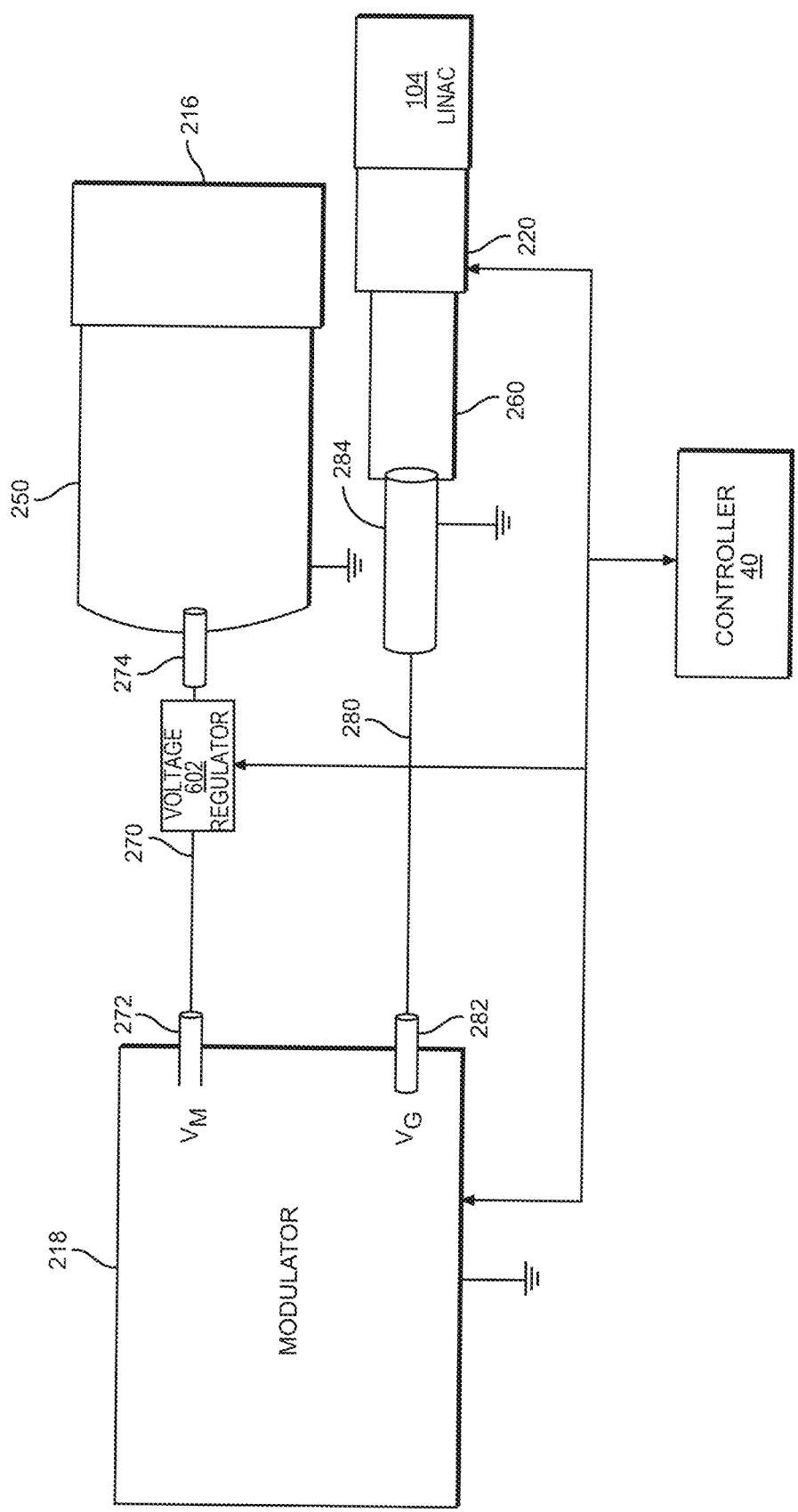
FIG. 7 is a simplified, schematic block diagram illustrating a portion of a radiation system, according to other example embodiments.

FIG. 7 is a simplified block diagram illustrating a portion of a radiation system, according to another example embodiment. The example embodiment shown in FIG. 7 is also similar to the radiation system shown in FIG. 1B, except that the radiation system in FIG. 7 includes the magnetron voltage regulator circuit 602 electrically connected between the modulator 218 and the magnetron 216 and does not include the voltage regulating circuit 302. In FIG. 7, like reference characters refer to like elements previously described, and thus, a detailed discussion of these like elements is not repeated.

As needed, the controller 40 may be configured to control the magnetron voltage regulator circuit 602 in the same or substantially the same manner as discussed above with regard to the voltage regulating circuit 302.

As noted above, a detailed discussion of the magnetron voltage regulator circuit 602 will be provided below with regard to FIG. 8.

Figure 8:
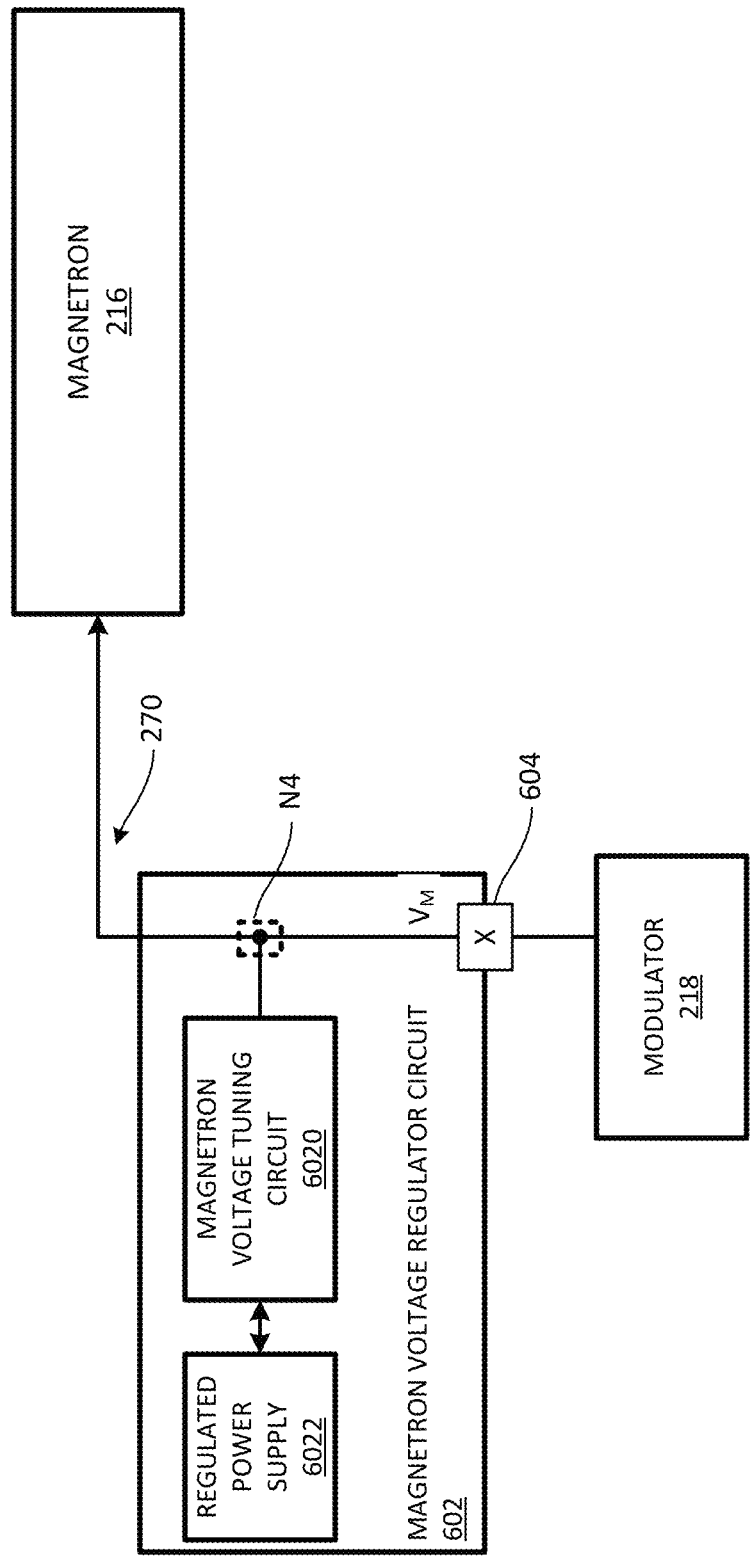
FIG. 8 is a simplified, schematic block diagram illustrating a portion of the radiation system shown in FIGS. 6 and/or 7, according to example embodiments.

FIG. 8 is a simplified, schematic block diagram illustrating a portion of the radiation systems shown in FIGS. 6 and/or 7. More specifically, FIG. 8 illustrates the portion of the radiation system including the magnetron voltage regulator circuit 602 (also referred to as the magnetron voltage regulator) electrically connected between the modulator 218 and the magnetron 216.

Similar to the voltage regulator circuits 302, 402 and 1202, the magnetron voltage regulator circuit 602 utilizes one or more reverse biased high voltage diodes. However, example embodiments should not be limited to this example.

In at least some example embodiments, the magnetron voltage regulator circuit 602 may be electrically connected between the modulator 218 and the magnetron 216, but not between the modulator 218 and the electron gun 220. Nonetheless, the magnetron voltage regulator circuit 602 may be configured to control a magnitude of voltage output from the modulator 218 for operation of the magnetron 216 and/or the electron gun 220.

Referring to FIG. 8, the magnetron voltage regulator circuit 602 includes a magnetron voltage tuning circuit 6020 and a regulated power supply 6022. The magnetron voltage tuning circuit 6020 may be configured in the same or substantially the same manner as the voltage tuning circuit 3020 shown in FIGS. 4 and 12 or the voltage tuning circuit 4020 shown in FIG. 5, but with differences in values for the circuit components included therein.

The regulated power supply 6022 may be similar to the regulated power supply 3022 shown in FIG. 4, except that the limiting voltage would be about −55 kV.

Since the configuration of the magnetron voltage regulator circuit 602 may be similar to the voltage regulator circuits 302, 402 and/or 1202 discussed above, a detailed discussion of the circuit elements is not repeated here. Moreover, although not discussed in detail herein for the sake of brevity, the magnetron voltage regulator circuit 602 may also be configured in the same or substantially same manner as the voltage regulator circuit 1002 of FIG. 10 or the voltage regulator circuit 1402 of FIG. 14.

Still referring to FIG. 8, a source impedance 604 of the modulator 218 may be present between the modulator 218 and a fourth node N4 at which the magnetron voltage tuning circuit 6020 and the magnetron 216 are also connected. Although discussed with regard to a source impedance, example embodiments should not be limited to this example. Rather, according to one or more other example embodiments (e.g., for higher power applications), a current and/or voltage limiting device (e.g., a relatively small pulse transformer with a core that saturates at a threshold power level) may be positioned at 604. In yet another example, a relatively low inductance resistor may be positioned at 604 in FIG. 8.

In example operation, when the modulator 218 is not outputting voltage pulses (e.g., not pulsing), the magnetron voltage tuning circuit 6020 (e.g., via a first diode) insulates the magnetron 216 from the applied bias voltage (from the regulated power supply 6022) so that the bias voltage has no impact on the magnetron 216.

When activated, the modulator 218 outputs a negative voltage pulse to the magnetron 216. When the magnitude of the negative voltage pulse output from the modulator 218 exceeds the magnitude of the negative bias voltage, magnetron voltage tuning circuit 6020 diverts excess current from the modulator 218. Accordingly, the magnetron voltage regulator circuit 602 limits and/or caps the magnetron voltage by the negative bias voltage. As long as the bias voltage is lower in magnitude (less negative) than the applied voltage $V_M$ from the modulator 218, the magnetron voltage may be down regulated by controlling the bias voltage at the regulated power supply 6022. As noted above, the regulated power supply 6022 may be controlled by the controller 40 according to user input via one or more user input devices.

Locating the voltage regulator circuit in the magnetron net may improve response time.

One or more example embodiments described herein may suppress and/or eliminate the need for a separate electron gun driver. Consequently, a single device may be utilized to power the electron gun and magnetron of a radiation system, thereby reducing costs per machine and/or freeing up (e.g., significant) space in, for example, the gantry of the radiation system.

One or more example embodiments described herein may also improve the tunability of radiation systems by allowing for beam energy and/or beam current to be controlled independently.

One or more example embodiments described herein may also suppress voltage spikes in the electron gun and/or magnetron, thereby protecting the radiation system from potentially catastrophic arcing that may damage and/or destroy the electron gun.

One or more example embodiments described herein may reduce production cost and/or time while also improving reliability in the field.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware, for example, processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUS), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "memory," "storage medium," "processor readable medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

The terms "including" and/or "having," as used herein, are defined as comprising (i.e., open language). The term "coupled," as used herein, is defined as connected, although necessarily not directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, medical systems, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner. Benefits, other advantages, and solutions to problems have been described above with regard to specific embodiments. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A radiation system comprising:
    a modulator configured to output a voltage for operation of a magnetron and an electron gun of the radiation system; and
    at least one voltage regulator circuit electrically connected between the modulator and at least one of the magnetron or the electron gun, the at least one voltage regulator circuit configured to control a magnitude of the voltage output from the modulator for operation of the at least one of the magnetron or the electron gun, wherein
        the at least one voltage regulator circuit includes a voltage tuning circuit electrically connected between the modulator and the at least one of the magnetron and the electron gun, the voltage tuning circuit having a first node and being configured to provide a bias voltage at the first nose to control the voltage output from the modulator for operation of the at least one of the magnetron the electron gun.

2. The radiation system of claim 1, wherein the at least one voltage regulator circuit is configured to downregulate or limit the magnitude of the voltage output from the modulator for operation of the at least one of the magnetron or the electron gun.

3. The radiation system of claim 1, wherein the at least one voltage regulator circuit is electrically connected between the modulator and only one of the magnetron or the electron gun.

4. The radiation system of claim 1, wherein the at least one voltage regulator circuit is electrically connected between the modulator and the electron gun.

5. The radiation system of claim 4, wherein the at least one voltage regulator circuit is configured to control the magnitude of the voltage output from the modulator by diverting current in excess of a threshold from the modulator to a charge storage circuit.

6. The radiation system of claim 5, wherein the charge storage circuit includes a storage capacitor.

7. The radiation system of claim 4, wherein the at least one voltage regulator circuit is configured to regulate the voltage output from the modulator for operation of the electron gun.

8. The radiation system of claim 1, wherein the at least one voltage regulator circuit includes at least two voltage regulator circuits, the at least two voltage regulator circuits comprising:
    an electron gun regulator circuit electrically connected between the modulator and the electron gun; and
    a magnetron regulator circuit electrically connected between the modulator and the magnetron.

9. The radiation system of claim 1, wherein the at least one voltage regulator circuit is configured to control the voltage output from the modulator for operation of the electron gun independent of the voltage output from the modulator for operation of the magnetron.

10. The radiation system of claim 1, wherein the modulator is a solid-state modulator.

11. The radiation system of claim 1, wherein the at least one voltage regulator circuit is electrically connected between the modulator and the magnetron.

12. The radiation system of claim 1, wherein the voltage tuning circuit comprises:

a charge storage circuit configured to provide the bias voltage at the first node, the charge storage circuit being further configured to be charged by pulses output from the modulator.

13. The radiation system of claim 12, further comprising:
a discharge circuit electrically connected to the first node, the discharge circuit configured to discharge the charge storage circuit in response to determining that the bias voltage exceeds a threshold voltage value.

14. A radiation system comprising:
a modulator configured to output a voltage for operation magnetron and an electron gun of the radiation system; and
at least one voltage regulator circuit electrically connected between the modulator and at least one of the magnetron or the electron gun, the at least one voltage regulator circuit configured to control a magnitude of the voltage output from the modulator for operation of the at least one of the magnetron or the electron gun, wherein
the at least one voltage regulator circuit is electrically connected between the modulator and the electron,
the at least one voltage regulator circuit is configured to regulate the voltage output from the modulator for operation of the electron gun, and
the at least one voltage regulator circuit includes
a voltage tuning circuit electrically connected between the modulator and the electron gun, and
a regulated power supply electrically connected to the voltage tuning circuit, the regulated power supply configured to apply a bias voltage to a first node of the voltage tuning circuit to tune the voltage output from the modulator for operation of the electron gun.

15. The radiation system of claim 14, wherein the voltage tuning circuit comprises:
a charge storage circuit connected to the first node; and wherein
the voltage tuning circuit is configured to tune the voltage output from the modulator by diverting current in excess of a threshold current value from the modulator to the charge storage circuit.

16. The radiation system of claim 15, further comprising:
a discharge circuit electrically connected to the first node, the discharge circuit configured to discharge the charge storage circuit in response to determining that the bias voltage exceeds a threshold voltage value.

17. A radiation system comprising:
a modulator configured to voltage for operation magnetron and an electron gun of the radiation system; and
at least one voltage regulator circuit electrically connected between the modulator and the magnetron, the at least one voltage regulator circuit configured to control a magnitude of the voltage output from the modulator for operation the magnetron, wherein
the at least one voltage regulator circuit includes a voltage tuning circuit electrically connected between the modulator and the magnetron, the voltage tuning circuit configured to provide a bias voltage to tune the voltage output from the modulator for operation of the magnetron.

18. A radiation system comprising:
a modulator configured to output a voltage for operation of a magnetron and an electron gun of the radiation system, the modulator including a transformer winding; and
a voltage regulator circuit electrically connected to a stand-alone tab from the transformer winding of the modulator, the voltage regulator circuit configured to control a magnitude of the voltage output from the modulator for operation of the magnetron and the electron gun.

19. The radiation system of claim 18, wherein the stand-alone tab is separate from a first tab connected to the electron gun and a second tab connected to the magnetron.

20. The radiation system of claim 18, wherein the voltage regulator circuit includes a voltage tuning circuit, the voltage tuning circuit being configured to provide a bias voltage at a first node to control the voltage output from the modulator for operation of the magnetron and the electron gun.

* * * * *